United States Patent
Harris et al.

(10) Patent No.: US 9,191,659 B2
(45) Date of Patent: Nov. 17, 2015

(54) COLLIMATED STEREO DISPLAY SYSTEM

(75) Inventors: Gordon Harris, Fergus (CA); Lawrence Stewart Paul, Encino, CA (US); Roy C. Anthony, Waterloo (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 623 days.

(21) Appl. No.: 13/297,814

(22) Filed: Nov. 16, 2011

(65) Prior Publication Data
US 2013/0120362 A1 May 16, 2013

(51) Int. Cl.
| | |
|---|---|
| *G06T 15/00* | (2011.01) |
| *H04N 13/04* | (2006.01) |
| *G06T 19/00* | (2011.01) |
| *G06T 19/20* | (2011.01) |
| *G06T 17/20* | (2006.01) |
| *G02B 27/22* | (2006.01) |
| *G02B 27/26* | (2006.01) |
| *G09B 9/32* | (2006.01) |

(52) U.S. Cl.
CPC ............ *H04N 13/0459* (2013.01); *G06T 19/00* (2013.01); *H04N 13/0452* (2013.01); *H04N 13/0468* (2013.01); *G02B 27/2207* (2013.01); *G02B 27/26* (2013.01); *G06T 17/20* (2013.01); *G06T 19/20* (2013.01); *G09B 9/326* (2013.01); *H04N 13/0434* (2013.01); *H04N 13/0438* (2013.01); *H04N 13/0472* (2013.01); *H04N 13/0475* (2013.01); *H04N 13/0477* (2013.01)

(58) Field of Classification Search
CPC ......... G06T 19/00; G06T 17/20; G06T 17/00; H04N 13/0409; H04N 13/0497; G02B 27/2264
See application file for complete search history.

(56) References Cited

U.S. PATENT DOCUMENTS

| | | |
|---|---|---|
| 5,691,844 A | 11/1997 | Oguchi et al. |
| 5,908,300 A | 6/1999 | Walker et al. |
| 6,999,071 B2 | 2/2006 | Balogh |

(Continued)

FOREIGN PATENT DOCUMENTS

| | | |
|---|---|---|
| EP | 0963122 A2 | 12/1999 |
| WO | 8805553 A1 | 7/1988 |
| WO | 2004099842 A1 | 11/2004 |

OTHER PUBLICATIONS

Tyler, et al.; A Personal Surround Environment: Projective Display with Correction for Display Surface Geometry and Extreme Lens Distortion; Virtual Reality Conference; 2007; 147-154.

(Continued)

*Primary Examiner* — James A Thompson
*Assistant Examiner* — Tapas Mazumder
(74) *Attorney, Agent, or Firm* — Avyno Law P.C.

(57) ABSTRACT

A collimated stereo display system is provided. The system comprises: an image generator enabled to provide a stream of stereoscopic images comprising left eye images and right eye images; at least one image modulator enabled to receive the stream of stereoscopic images from the image generator and form light into the stereoscopic images for viewing at a viewing apparatus for filtering the light into the left eye images and the right eye images respectively thereby providing a three dimensional rendering of the stereoscopic images when viewed through the viewing apparatus; and, collimation apparatus enabled to receive and collimate the light from the at least one image modulator, such that rays of light are substantially parallel when the stereoscopic images are received at the viewing apparatus.

5 Claims, 18 Drawing Sheets

(56) References Cited

U.S. PATENT DOCUMENTS

| | | |
|---|---|---|
| 2003/0234909 A1 | 12/2003 | Collender et al. |
| 2006/0232665 A1* | 10/2006 | Schowengerdt et al. ....... 348/51 |
| 2009/0231331 A1* | 9/2009 | Holland .......................... 345/419 |
| 2010/0123880 A1* | 5/2010 | Oren .............................. 353/98 |
| 2010/0171697 A1* | 7/2010 | Son et al. ...................... 345/158 |
| 2012/0056876 A1* | 3/2012 | Lee et al. ...................... 345/419 |

OTHER PUBLICATIONS

Corresponding European Patent application No. 12 192 213.2, Examination Reported dated Jul. 14, 2014; 7pp.

Corresponding European Patent Application No. 12192213.2, Examination Report dated Jul. 14, 2014.

Corresponding European Patent application No. 12 192 213.2, Examination Reported dated Apr. 17, 2015; 14pp.

\* cited by examiner

COLLIMATED STEREO DISPLAY SYSTEM

FIELD

The specification relates generally to three dimensional displays, and specifically to a collimated stereo display system.

BACKGROUND

Three dimensional displays generally suffer from a problem of inducing eye strain in some viewers due to conflicts between accurate presentation of stereopsis, vergence and accommodation. For example, 3D displays generally require a viewer to always focus at the screen plane to keep it in focus, but depth cues from accommodation are inconsistent with depth cues from vergence.

For example, as the focal plane remains at the plane of the screen, a viewer's eyes are forced to converge on stereoscopic objects whose parallax implies a position in space which differs from the screen plane. Consider a screen plane 10 feet away from a viewer. Their eyes remain focused on the screen plane, however a stereoscopic presentation implies that an object is 15 feet away from the viewer. The object then moves from an implied 15 feet away from the viewer to an implied 7 feet away from the viewer. All the while the eyes remain accommodated/focused on a fixed screen plane that is 10 feet away.

The human brain has short-cuts in it that allow humans to expect a learned response, or muscle memory level of accommodation/focus. The systems of vergence and focus are thus normally cooperative. In a stereo solution with a planar display the viewer is asked to decouple this relationship that the viewer has learned to utilize to gauge distance. This decoupling induces fatigue and stress over time.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
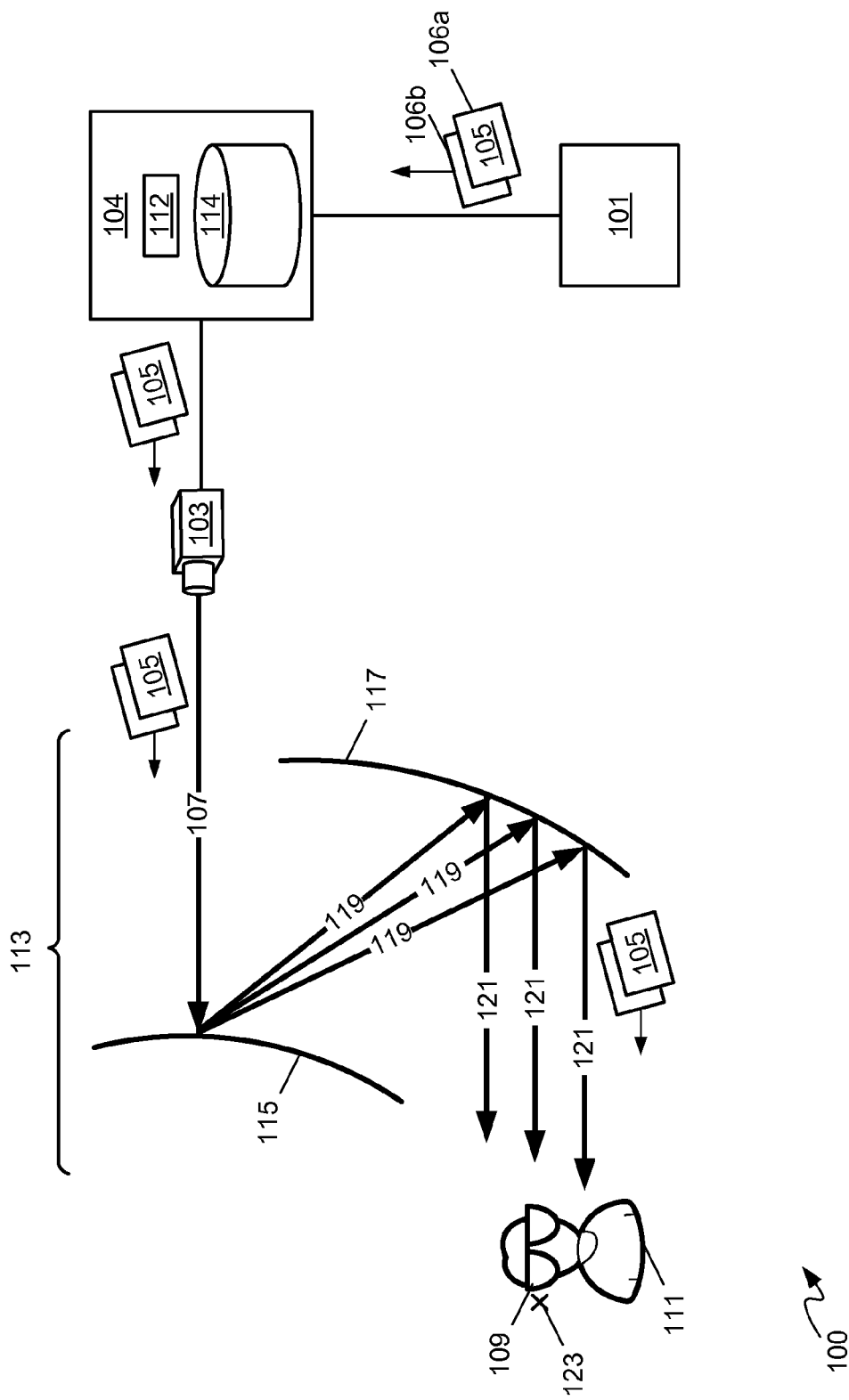
FIG. 1 depicts a collimated stereo display system, according to non-limiting implementations.

An aspect of the specification provides a system comprising: an image generator enabled to provide a stream of stereoscopic images comprising left eye images and right eye images; at least one image modulator enabled to receive the stream of stereoscopic images from the image generator and form light into the stereoscopic images for viewing at a viewing apparatus for filtering the light into the left eye images and the right eye images respectively thereby providing a three dimensional rendering of the stereoscopic images when viewed through the viewing apparatus; and, collimation apparatus enabled to receive and collimate the light from the at least one image modulator, such that rays of light are substantially parallel when the stereoscopic images are received at the viewing apparatus.

The system can further comprise: at least one projector for projecting the stereoscopic images, the at least one projector comprising the at least one image modulator; a least one screen upon which the stereoscopic images are projected; and at least one collimating mirror for reflecting the stereoscopic images from the at least one screen such that reflected light is collimated, the collimating apparatus comprising the at least one screen and the at least one collimating mirror. The at least one collimating mirror can be one of spherical and parabolic, and the at least one screen can be a shape complimentary to the at least one collimating mirror.

The collimating apparatus can comprise: a least one screen upon which the stereoscopic images are provided; and at least one collimating mirror for reflecting the stereoscopic images from the at least one screen such that reflected light is collimated.

The system can further comprise a computing device enabled for at least one of: warping the stereoscopic images prior to the at least one image modulator forming the light into the stereoscopic images; repeating the warping based on a changed position of the viewing apparatus relative to the collimation apparatus; varying an interocular distance between the left eye images and the right eye images; and inserting two dimensional images into the stream of stereoscopic images.

The system can further comprise an immersive environment, such that the stereoscopic images are associated with an immersive experience in the immersive environment. The immersive environment can comprise one or more of a simulation environment, and a flight simulator, and a driving simulator. The immersive environment can comprise one or more of a visualization environment, a microscopy visualization environment, a medical imaging visualization environment, an oil and gas visualization environment, and a seismology visualization environment. The immersive environment can comprise a training environment.

The system can further comprise: head tracking apparatus enabled to acquire a position of the viewing apparatus; and a processor enabled to adjust the stereoscopic images for viewing based on one or more of the position and the orientation of the viewing apparatus. The stereoscopic images can be projected onto a curved surface for viewing and the processor can be further enabled to adjust the stereoscopic images based on a geometry of the curved surface. The system can further comprise a memory for storing data indicative of the geometry. The processor can be further enabled to adjust the stereoscopic images based on the geometry of the curved surface by: determining images for display, the images comprising the stereoscopic images when they are to be provided on a flat screen; determining a distortion of the flat screen based on the data indicative of the geometry of the curved surface and the position of the viewing apparatus; and adjusting the images based on the distortion such that the stereoscopic images will appear undistorted when projected onto the curved surface. Adjusting the stereoscopic images can be repeated each time a change in position of the viewing apparatus is determined. The collimating apparatus can comprise a collimating mirror and the collimating mirror can be enabled to reflect the light from the curved surface such that reflected light is collimated.

The system can further comprise: a processor enabled to adjust the stereoscopic images by varying interocular distance of the left eye images and the right eye images. The interocular distance can be varied based on a virtual distance between a viewer of the stereoscopic images and at least one given feature in the stereoscopic images. The interocular distance can be varied such that the left eye images and the right eye images are provided in hyperstereo. The left eye images and the right eye images can be provided in hyperstereo when the virtual distance is one or more of above a first given threshold value and below a second given threshold value.

The system can further comprise: a processor enabled to insert two dimensional images into the stream of stereoscopic images based on a virtual distance between a viewer of the stereoscopic images and at least one given feature in the stereoscopic images. The processor can be further enabled to insert the two dimensional images into the stream of stereoscopic images by replacing one of the left eye images and the right eye images with the other of the right eye images and the left eye images. The processor can be further enabled to insert the two dimensional images into the stream of stereoscopic images when the virtual distance is one or more of above a first given threshold value and below a second given threshold value.

Figure 2:
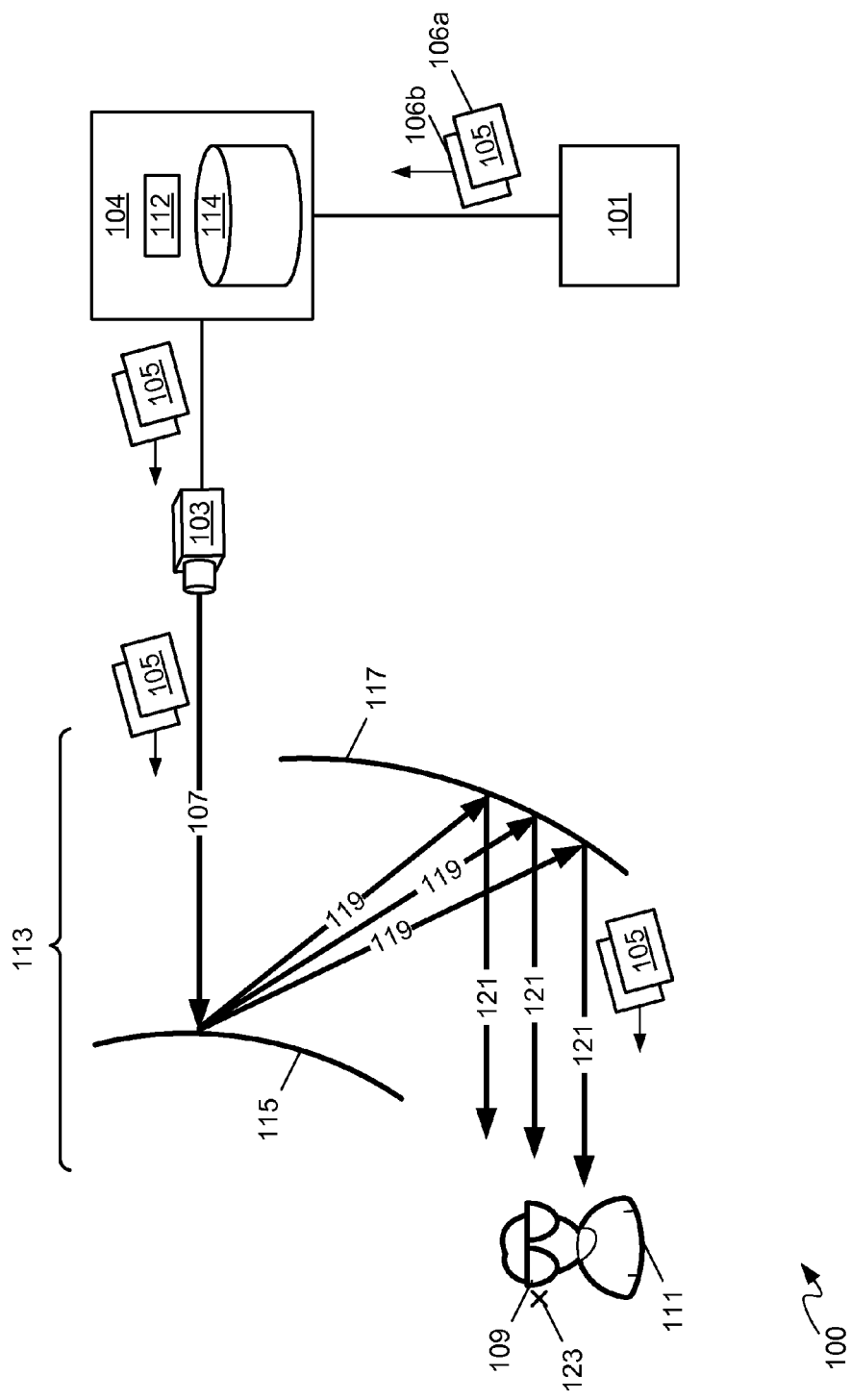
FIG. 2 depicts the system of FIG. 1 in use, according to non-limiting implementations.

Attention is directed to FIG. 1, which depicts a collimated stereo display system 100, according to non-limiting implementations, and FIG. 2, depicts system 100 in use. System 100 generally comprises an image generator 101 in communication with at least one image modulator 103. Image generator 101 is generally enabled to provide a stream of stereoscopic images 105 comprising left eye images 106a and right eye images 106b. It is also appreciated that while left eye images 106a and right eye images 106b are labelled only once in FIG. 1, and subsequent figures, they are nonetheless present in stereoscopic images 105.

As depicted, image generator 101 is in communication with at least one image modulator 103 via an optional computing device for processing stereoscopic images 105, as will be presently explained. Computing device 104 can comprise any suitable computing device, including but not limited to a warping engine, a video processing device, a personal computer (PC), a server, and the like. In general, computing device 104 comprises a processor 112 and a memory 114 (which can comprise volatile and non-volatile storage), as well as any suitable communication interfaces, input devices and display devices.

Image generator 101 can comprise any suitable image generator, including but not limited to, a storage device for storing three dimensional cinema files, three dimensional video files, three dimensional display files, a video game systems, a simulation system, a visualization system, a training system, and the like.

At least one image modulator 103 is generally enabled to receive the stream of stereoscopic images 105 from image generator 101 and form light 107 into stereoscopic images 105 for viewing at a viewing apparatus 109. For example, in depicted implementations, at least one image modulator 103 comprises a projector for projecting stereoscopic images 105. Hereafter at least one image modulator 103 will also be referred to as image modulator 103 without undue limitation as it is appreciated that system 100 can comprise one or more image modulators 103. Furthermore, this convention will be used throughout the specification.

Image modulator 103, image generator 101 and computing device 104, if present, can be in wired or wireless communication, as desired, using any suitable protocol and can be local or remote from one another.

Viewing apparatus 109 is generally enabled for filtering light 107 into left eye images 106a and right eye images 106b, respectively thereby providing a three dimensional rendering of stereoscopic images 105 when viewed through viewing apparatus 109.

In other words, system generally comprises a "3D" ("three-dimensional") system for viewing images in three dimensions, and hence image modulator 103 comprises a "3D" projector for projecting stereoscopic images 105 that can be separated into left eye images 106a and right eye images 106b by viewing apparatus 109 ("3D" glasses), using any suitable technology. Indeed, it is generally appreciated that viewing apparatus 109 is compatible with image modulator 105. For example, in implementations where image modulator 103 projects left eye images 106a and right eye images 106b with different polarization states (including but not limited to orthogonal linear polarization states and clockwise/counterclockwise circular polarization states), viewing apparatus 109 comprises suitable polarized filters for filtering left eye images 106a and right eye images 106b into the respective eye of a viewer 111. Similarly, in implementations where image modulator 103 alternately projects left eye images 106a and right eye images 106b, one after the other, viewing apparatus 109 comprises suitable electronic shutters (including but not limited to LCD (liquid crystal display) based shutters) which are opened and closed accordingly as each of left eye images 106a and right eye images 106b are projected, thereby for filtering left eye images 106a and right eye images 106b into the respective eye of a viewer 111. In any event, it is appreciated that the method of providing stereoscopic images 105 for viewing via viewing apparatus 109 is not to be considered particularly limiting. For example, other implementations include, but are not limited to active or passive stereo display systems using color comb filters and/or polarizer filters.

It is further appreciated that, while viewing apparatus 109 are depicted in FIG. 1 as facing out of the page, such a depiction is schematic only and viewer 111 normally, substantially faces mirror 117 to view images 105.

It is generally appreciated that stereoscopic images 105 are to be provided at a suitable surface for viewing, such as a screen. However, in contrast to prior art 3D systems, system 100 further comprises a collimation apparatus 113 enabled to receive and collimate light 107 from image modulator 103, such that rays 121 of light 107 are substantially parallel when stereoscopic images 105 are received at viewing apparatus 109. In depicted non-limiting implementations, collimation apparatus 113 comprises: at least one screen 115 upon which stereoscopic images 105 are projected; and at least one collimating mirror 117 for reflecting stereoscopic images 105 from screen 115 such that reflected light 119 is collimated.

Screen 115 can comprise any suitable screen enabled to scatter/reflect light 107 which is then subsequently reflected by collimating mirror 117. It is appreciated that screen 115 is generally convex, including, but not limited to, generally spherical and generally parabolic. Use of a convex screen provides advantages over prior art two-dimensional simulators, which tend to used concave screens upon which images are viewed. For example, concave screens suffer from cross talk from side to side and top to bottom as light from images on each side are reflected off of an opposite side of the concave screen. This leads to degraded contrast, flare and ghosting. It is furthermore appreciated that such problems can be made worse via use of back projection and/or rear projection onto concave screens. For example, rear projection concave screens usually used in flight simulators are widely misunderstood. They are often falsely cited as being brighter and with more contrast than front projection systems, but that is really only in high ambient light. On the contrary, many rear projection screens suffer from severe ghosting off axis rays, due to geometric scattering and screen absorption, causing double images and flare. In contrast, by using a convex front projection screen, the cross talk problem is eliminated, which leads to improved contrast, improved brightness, improved resolution, lower cost, relaxed projector placement, reduced flare, reduced ghosting and the like.

Collimating mirror 117 can comprise any suitable concave mirror, including but not limited to a spherical mirror and a parabolic mirror, which has the general property of reflecting light in substantially parallel rays 121. Hence, in contrast to prior art 3D systems, light/parallel rays 121 forming stereoscopic images 105 is collimated when arriving at viewing apparatus 109 such that eyes of viewer 111 are not focussed at screen 115 or collimating mirror 117 but at infinity. The advantages of this are described below with reference to FIGS. 3 to 8.

However, it is appreciated that parabolic mirrors can provide better collimation than a spherical mirror. However parabolic mirrors can be expensive to manufacture while spherical mirrors are cheaper and easier to manufacture though spherical mirrors can cause some coma at edges. Nonetheless, spherical mirrors can be an adequate trade-off between degree of collimation and expense. Hence, it is appreciated that collimation of collimating mirror 117 does not need to be perfect.

Further, collimating mirror 117 can comprise any suitable material, including but not limited to glass, and Mylar™ film. In the later case, it can be challenging to manufacture Mylar™ film mirrors which are actually perfectly parabolic or perfectly spherical, and in general Mylar™ film mirrors generally comprise a boundary and pressure limited catenary curve often with some saddle bulging in the middle, for cross cockpit wide field of view displays. However, while performance and comfort decrease as more aberrations appear with lesser quality mirrors, the degree of collimation is generally adequate.

It is furthermore appreciated that screen 115 has a shape complimentary to collimating mirror 117, and hence screen 115 is generally curved. For example, as collimating mirror 117 is generally concave, screen 115 is generally convex: e.g. in implementations where collimating mirror 117 is generally spherical and concave, screen 115 is also generally spherical and convex, and in implementations where collimating mirror 117 is generally parabolic and concave, screen 115 is generally parabolic and convex. However, it is appreciated that screen 115 need not be exactly complimentary to collimating mirror 117. For example, in implementations where collimating mirror 117 is spherical, screen 115 could be parabolic and vice versa, with corrections to images 105 performed by computing device 104 to correct for the resulting aberrations in the viewed images.

Indeed, it is further appreciated that deviations from ideal concave mirrors a convex screens are within the scope of present implementations. While such a system may not be ideal, such a system could still provide advantages with collimated stereoscopic displays described herein. For example, in some implementations, images 105 reflected from a flat screen (i.e. screen 115) could be viewed using a wide radius parabolic mirror (i.e. collimating mirror 117). In some of these implementations, corrections to images 105 can be performed by computing device 104 to correct for the resulting aberrations in the viewed images.

It is yet further appreciated that collimating mirror 117 is arranged such that parallel rays 121 that arrive at a design eye point (DEP) 123 that is generally aligned with eyes of viewer 111. It is furthermore appreciated that tracing parallel rays 121 back from DEP 123, yields convergence on points at screen 115, in focus for viewer 111. In other words, as depicted, each parallel ray 121 can be traced back to screen 115 via respective reflected light 119.

Further, it is appreciated that, in some implementations, a bottom of screen 115 can be clear or close to clear from a top portion of collimating mirror 117. In other words, screen 115 and collimating mirror 117 are arranged such that stereoscopic images 105 projected onto screen 115 are viewable by viewer 111, such that a top portion of collimating mirror 117 is not blocked by screen 115.

In depicted implementations, system 100 comprises computing device 104 enabled for warping stereoscopic images 105 prior to image modulator 103 forming light 107 into stereoscopic images 105. For example, stereoscopic images 105 are warped at computing device 104 such that when stereoscopic images 105 are projected onto curved screen 115 and viewed at viewing apparatus 109, via parallel rays 121, stereoscopic images 105 do not appear curved.

In further implementations, as will presently be described, computing device 104 can be further enabled for repeating the warping based on a changed position of viewing apparatus 109 relative to collimation apparatus 113. In other words, system 100 can further comprise head tracking apparatus, described below with reference to FIGS. 11 and 12, which tracks a position of viewing apparatus 109 and/or a head of viewer 111, and dynamically warps stereoscopic images 105 based on the position of viewing apparatus 109 and/or a head of viewer 111, to provide a changed viewpoint.

In yet further implementations, as will presently be described, computing device 104 can be further enabled for at least one of: varying an interocular distance (which can also be referred to as interpupilary distance) between left eye images 106a and right eye images 106b; and, inserting two dimensional images into stream of stereoscopic images 105.

However, in other implementations, image generator 101 can be enabled to perform all the functions of computing device 104; hence, in these implementations, image generator 101 and computing device 104 are combined into one device and image generator 101 then comprises computing device 104.

In some implementations, system 100 can be used for general 3D video applications, including but not limited to, 3D collimated cinema applications, collimated 3D displays, one person desktop collimated 3D displays, 3D collimated television, and 3D collimated video game systems.

It is further appreciated that system 100 can further comprise an immersive environment, such that stereoscopic images 105 are associated with an immersive experience in the immersive environment.

For example, the immersive environment comprises a simulation environment, including but not limited to a flight simulator, a driving simulator, a spaceship simulator, and the like. Hence, system 100 can comprise "real world" controls, as in a flight simulator, such that viewer 111 can control stereoscopic images 105 to provide, for example, a simulation of flight. Stereoscopic images 105 can hence be dynamically updated, in a feedback loop with image generator 101 (and optionally computing device 104), to comprise images of a "real world" simulation to replicate the real world, such that viewer 111 is interacting with the simulation environment in manner similar to interacting with the real world.

It has heretofore been conventionally understood that three dimensional effects were of no use in collimated display systems, such as simulation environments including flight simulators, as collimated light is assumed to arrive from an "optical infinity", which is generally taken as about 9 meters (about 30 feet). For example optical infinity is generally assumed to be a distance (for an average adult person) at which the angle of view of an object at that distance is effectively the same from both the left and right eyes, and hence it is further assumed that there is little advantage in using two-channel imagery and stereoscopic display systems. However, testing of a working prototype of system 100 configured as a flight simulator has shown these assumptions of the prior art to be false. Indeed, pilots interacting with the working prototype found the interactive experience provided by a collimated stereo display system to be more realistic than a collimated non-stereo display system.

Firstly, even at distances ranging from about 4 feet to at least about 400 meters (e.g. about ¼ of a mile) simulated features were producible with different views for the left and right eyes, that provided a noticeable and improved three dimensional effect with better depth perception.

Secondly, better resolution of the flight simulator was perceived when using stereoscopic images rather than two dimensional images, largely due to super-resolution effects; in other words, the human brain is able to superimpose the stereoscopic left and right eye images, and interpolate a higher resolution for the resulting image than if a single image was used for both the left and right eyes (i.e. two dimensional).

Thirdly, there are features that can be provided in flight simulators that are around 9 meters from a design eye point including, but not limited to, mid-air refuelling booms, low flying helicopters, driving simulators and landscape features when simulating landing. However, such features can be provided at greater than 9 meters and less than meters. In these situations pilots noted that three dimensional stereoscopic images provided a much more realistic experience than two dimensional imagery.

In further implementations, the immersive environment comprises a visualization environment, which is not necessarily related to a real world environment. For example, the visualization environment can include, but is not limited to, one or more of a CAVE (Cave Automatic Virtual Environment), a medical imaging visualization environment, an oil and gas visualization environment, a seismology visualization environment and the like. In these implementations, system 100 can comprise controls to "manipulate" the visualization environment. For example such a visualization environment, and associated controls, can be used to visualize and manipulate virtual medical molecules/drugs etc., oil deposits, seismic plates and the like, in stereoscopic images 105. It is further appreciated that collimated display systems have not heretofore been used in visualization environments, and certainly not combined with stereoscopic images. Indeed, within the general field of display systems, there tends to be little or no overlap between simulation environments and visualization environments.

In yet further implementations, the immersive environment comprises a training environment, including but not limited to training environments for repairing equipment and/or building equipment, and the like (e.g. industrial vehicle building and repair, as non-limiting example). For example, such a training environment, and associated controls, can be used to visualize and manipulate virtual items in stereoscopic images 105*a* for repairing and/or building equipment. It is further appreciated that collimated display systems have not heretofore been used in training environments, and certainly not combined with stereoscopic images.

Figure 3:
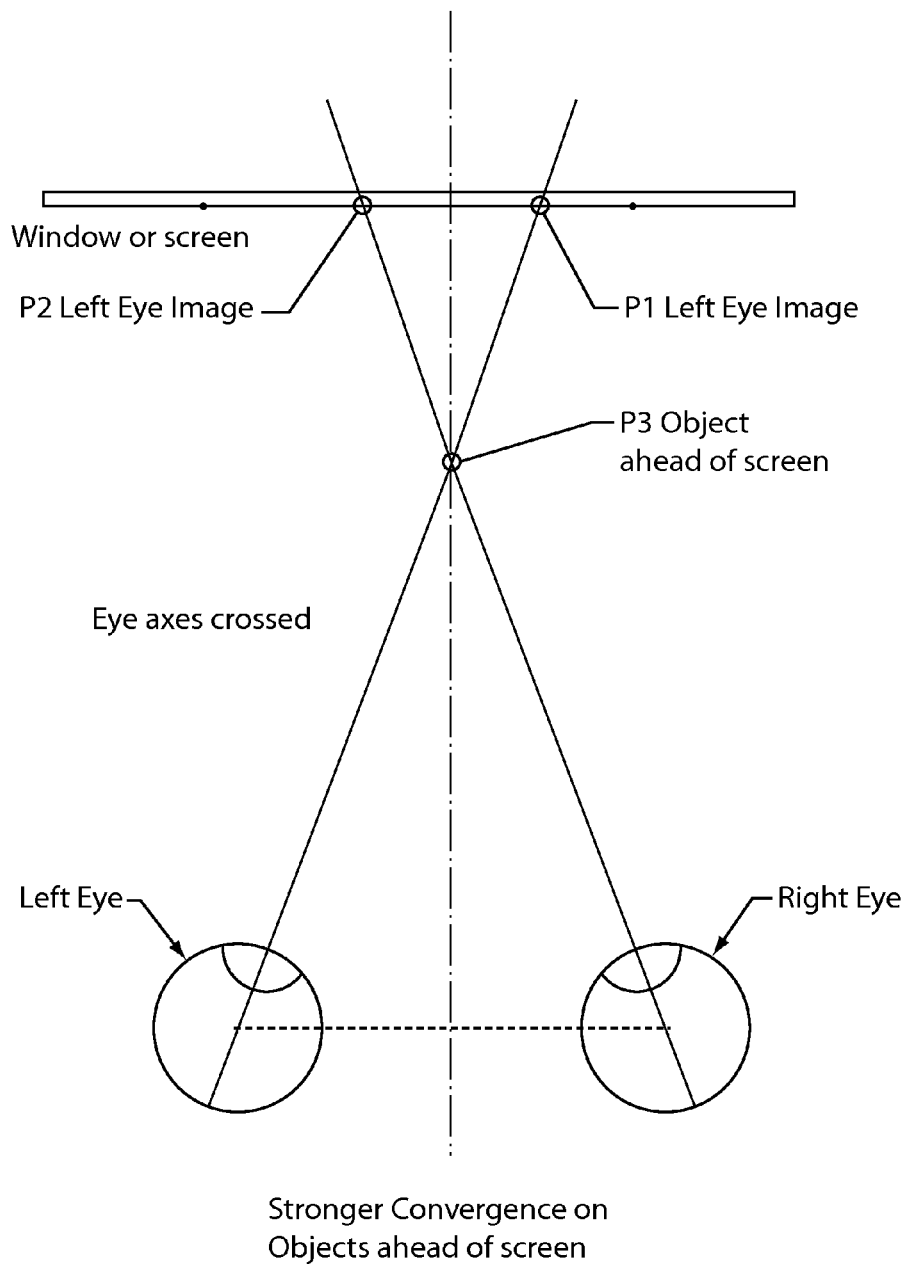
FIGS. 3 to 5 depict vergence behaviour of human eyes when focusing on virtual objects in stereoscopic images projected onto a screen, according to non-limiting implementations.
Figure 4:
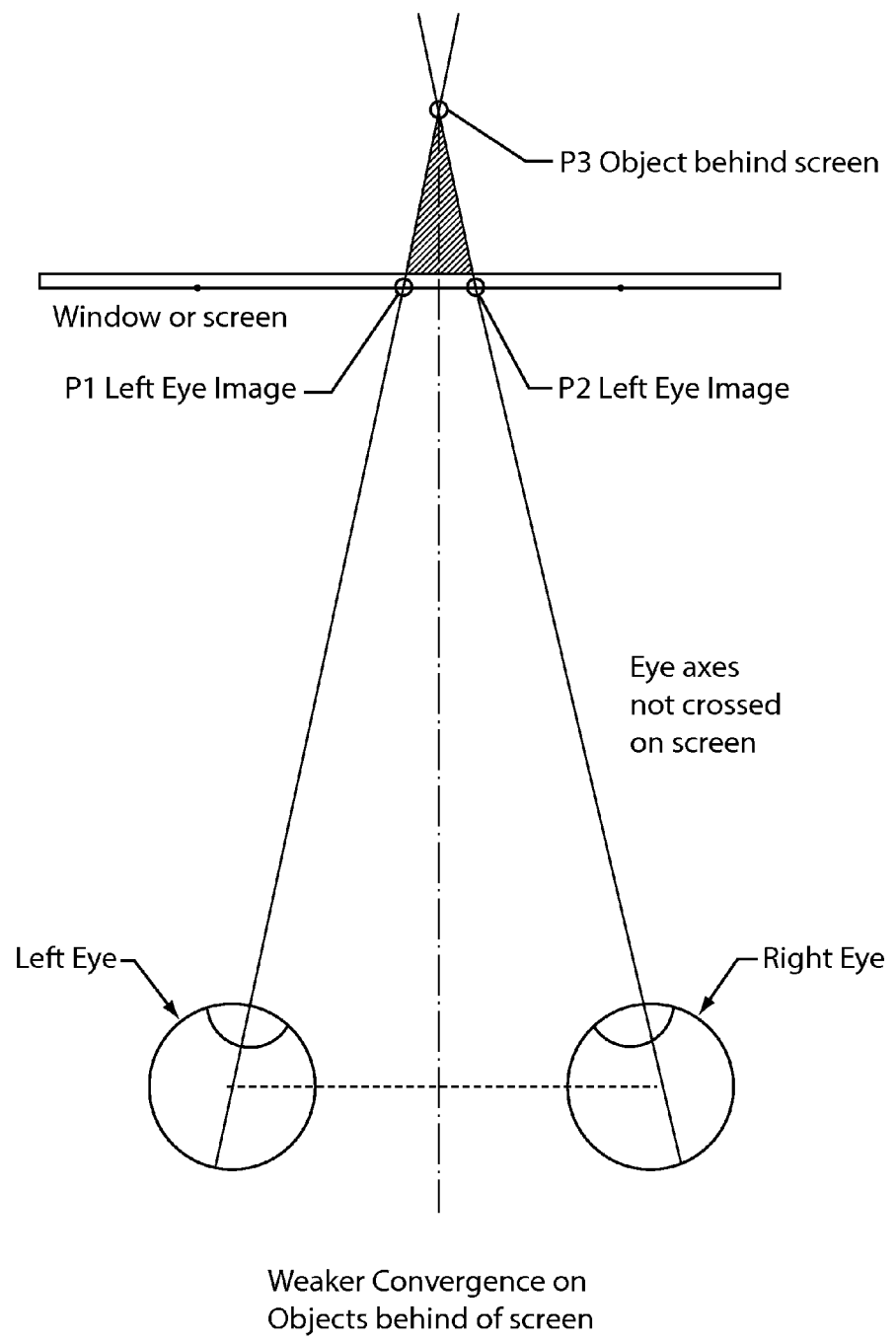
Figure 5:
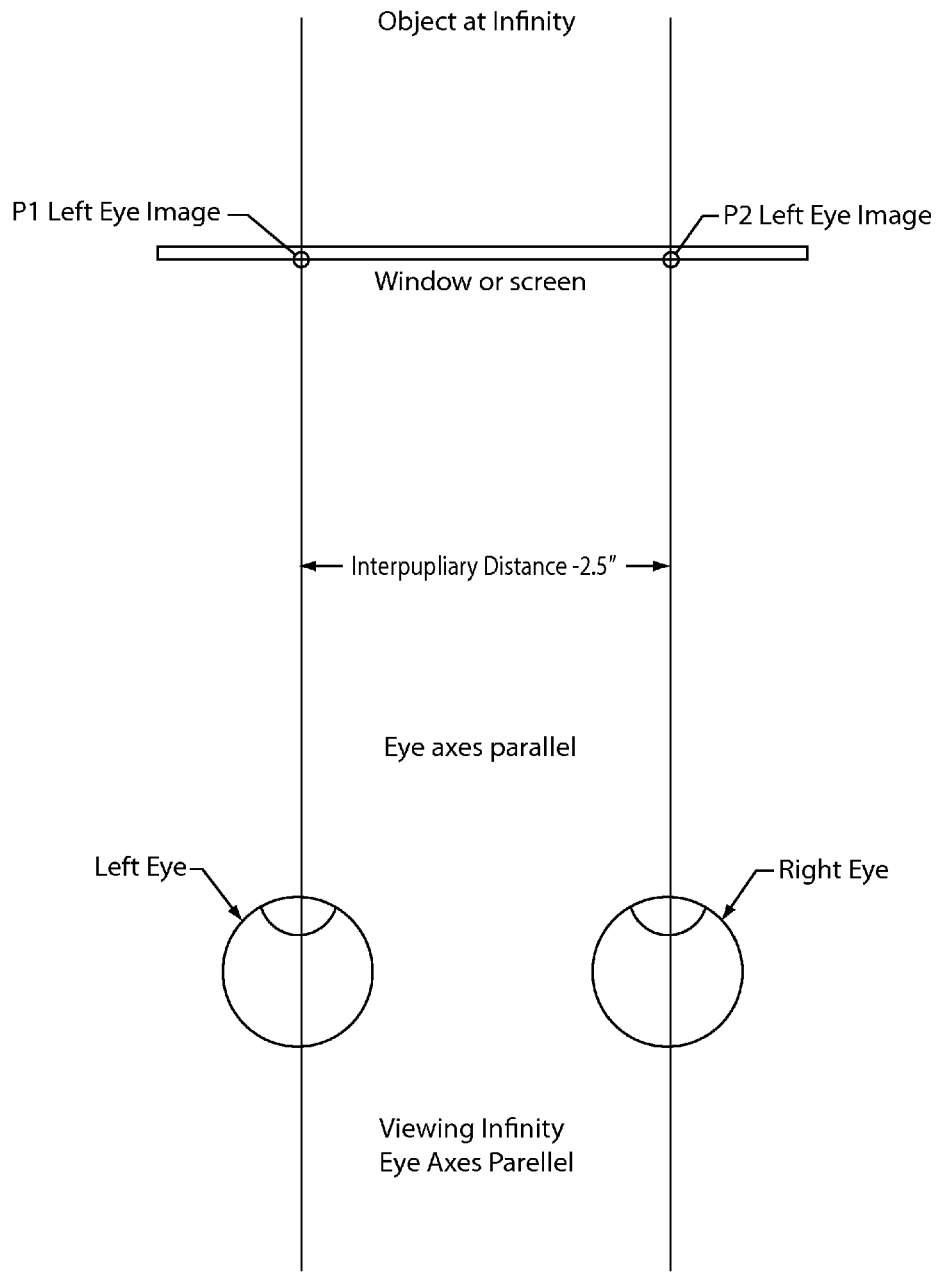

General advantages of the collimated stereo display are now discussed with reference to FIGS. 3 to 5 and FIGS. 6 to 8, and 18. Specifically, FIGS. 3 and 4 depict vergence behaviour of human eyes when focusing on virtual objects in stereoscopic images projected onto a screen, when the virtual objects are respectively "located" ahead of the screen and behind the screen. From FIG. 3 it is appreciated that the left eye and the right eye attempt to cross when the object P3 appears ahead of the screen (i.e. vergence), but at the same time the left eye image P1 and right eye image P2 are actually projected on the screen, which are conflicting stereoscopic cues which can cause headaches and nausea in a viewer. It is appreciated that the degree of discomfort can vary from viewer to viewer. With reference to FIG. 4, the problem becomes less acute when the object P3 is "located" behind the screen, as the eyes still attempt to converge. However, with reference to FIG. 5, and as in present implementations, when the object P3 (not depicted in FIG. 5) is nominally located at optical infinity, the vergence cues are generally in agreement with the actual location of the images P1, P2 (i.e. at the screen) and the eye axes are generally parallel, thereby reducing strain on the eye. Indeed, such a view generally simulates a real view out a real window—i.e. views separated by interocular (e.g. interpupilary) distance and comfortably relaxed, with axes substantially parallel, thereby reducing strain on the eye.

Figure 6:
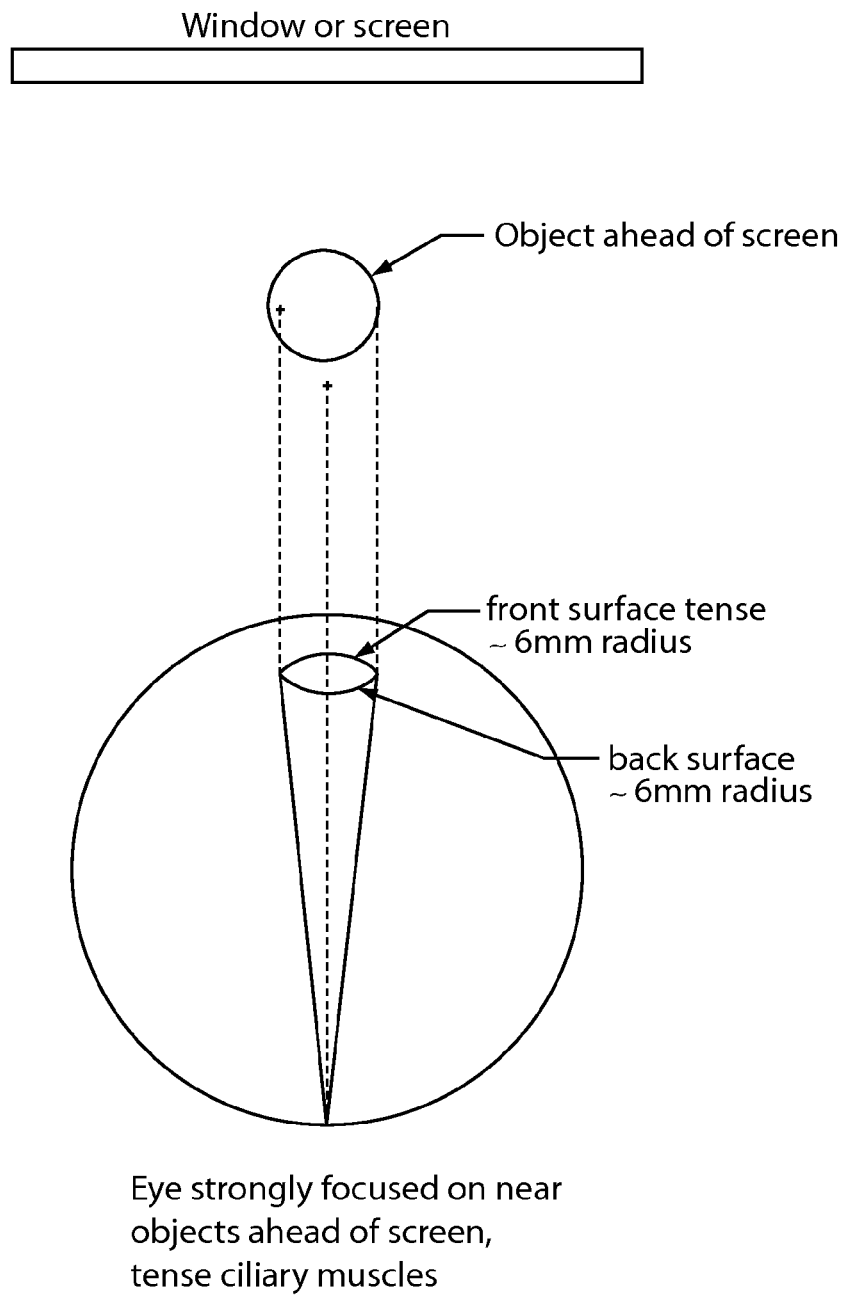
FIGS. 6 to 8 depict accommodation behaviour of human eyes when focusing on virtual objects in stereoscopic images projected onto a screen, according to non-limiting implementations.
Figure 7:
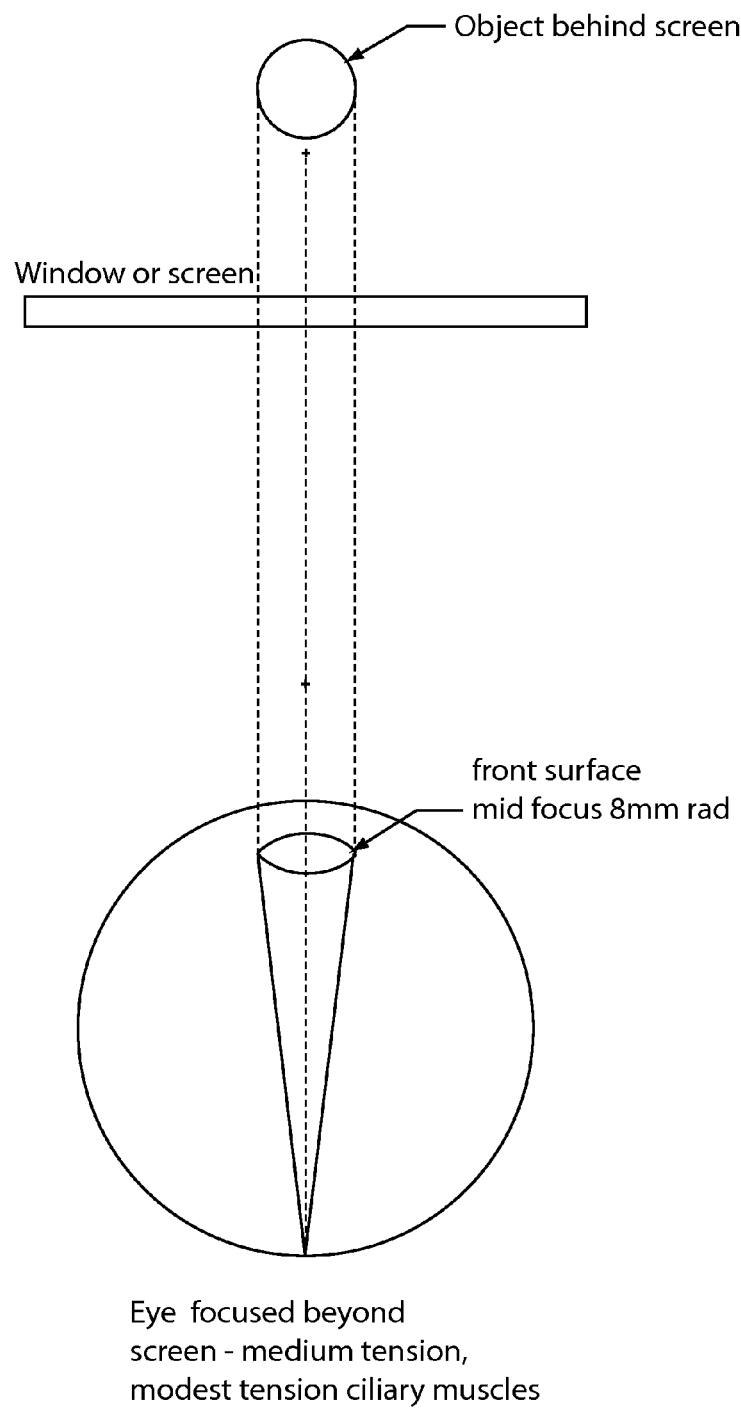

Further, focus of the eye (accommodation) is also in conflict when virtual objects in stereoscopic images are respectively "located" ahead of the screen and behind the screen For example, FIGS. 6 and 7 depict accommodation behaviour of human eyes when focusing on virtual objects in stereoscopic images projected onto a screen, when the virtual objects are respectively "located" ahead of the screen and behind the screen. With reference to FIG. 6, when the object is virtually located ahead of the screen, the eye attempts to focus ahead of the screen such that the front surface of the eye tenses, as do the ciliary muscles to force the eye lens to the curvature necessary to focus the image on the retina.

With reference to FIG. 7, the problem becomes slightly less acute when the object is "located" behind the screen, as the eyes and ciliary muscles undergo modest tension. However, the conflict between accommodation and vergence is still present.

Figure 8:
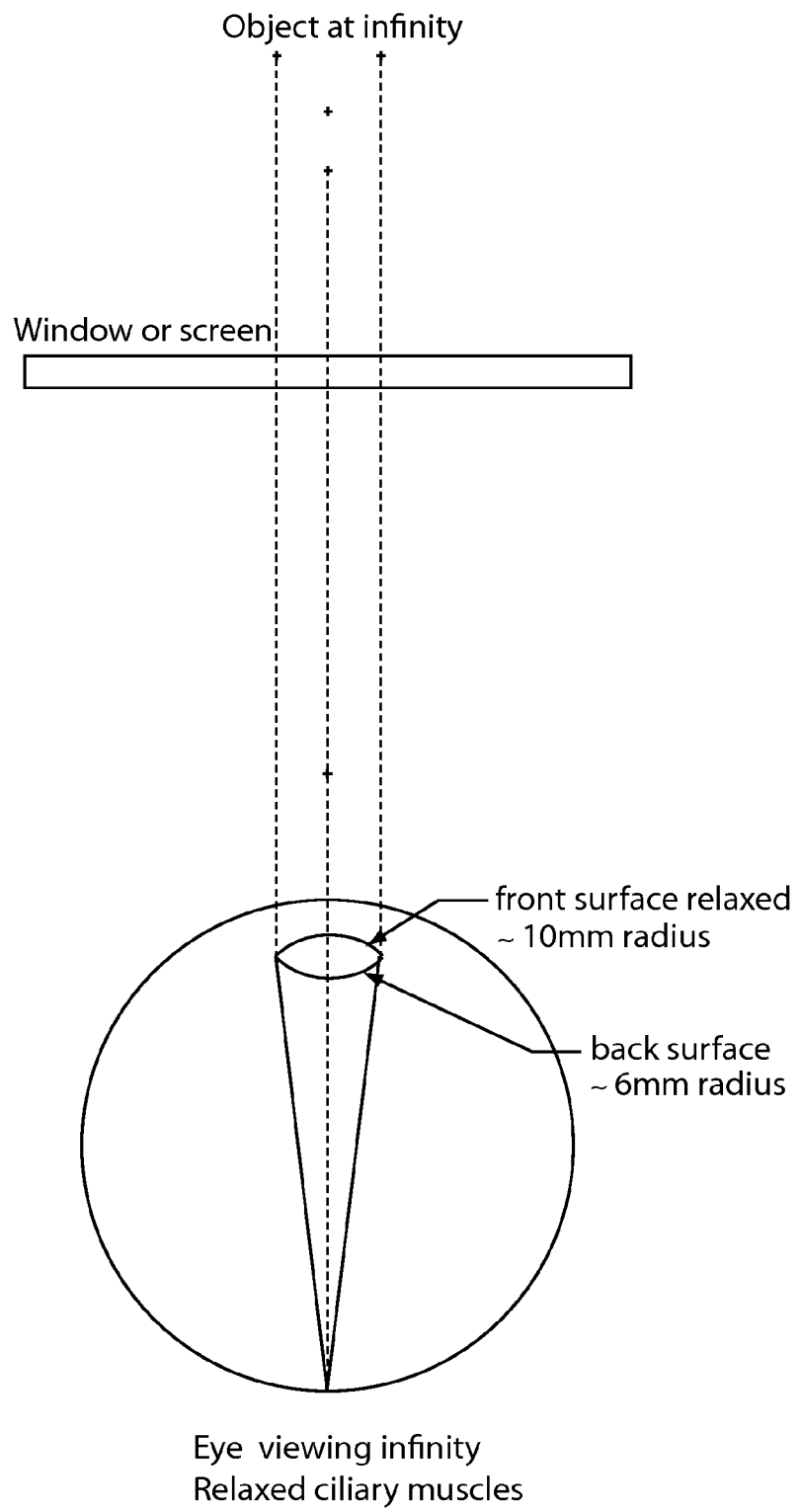

However, with reference to FIG. 8, and as in present implementations, when the object (not depicted in FIG. 8) is nominally located at optical infinity, the accommodation cues are generally in agreement with the actual location of the left and right eye images (i.e. at the screen) and the eye and ciliary muscles are generally relaxed, thereby reducing strain on the eye.

However, as discussed above, even when many objects are nominally located at optical infinity, by providing a collimated stereo display system 100, there are noticeable differences in view for the left and right eye images, and good stereoscopic images can be formed in system 100, hence providing a more comfortable three dimensional viewing experience over long periods of time without fatigue.

In other words, FIGS. 6, 7, and 8 are three "normal cases" of looking out a window. To further illustrate the issues addressed by the present specification, attention is directed to FIG. 18, which depicts an eye focusing on a window or screen plane (which is the normal case for all existing 3D displays). Indeed, while the human eye can focus on close objects, with 3D displays depth cues are in conflict, especially when objects are "virtually" depicted in front a screen when the image thereof is actually presented on the screen.

For example, when a viewer is watching 3D images e.g. games on a computer screen about 18 inches in front of the viewer, the viewer's focus is fixed, with the front lens surface being fairly steep and ciliary muscles contracted as in FIG. 6. But the stereo game, or simulation, or microscope or whatever is being displayed in 3D can be depicting an object (e.g. an aircraft) at infinity with proper vergence cues such as those depicted in FIG. 5. So the stronger vergence cue of stereo disparity on retinas says the image is at infinity, but the weaker depth cue from accommodation says it is actually only 18 inches away. It is this conflict in depth cues which causes eye strain.

It is even more eye straining and "unnatural" if the vergence cue are similar to those of FIG. 3, for an object in front of the computer screen, for example about 12 inches away when the focus accommodation cue are telling the viewer's brain that the object is still about 18 inches away.

Such a conflict is somewhat resolved by present implementations, as greater comfort and a more natural view of distant objects is achieved when both accommodation and vergence cues are generally in sync and the objects are "pushed" further away by collimating mirror 117 such that infinity looks like a real infinity out a window—with eyes relaxed both in vergence (uncrossed or parallel) and focus (i.e. relaxed flatter lenses). This makes it easier for a viewer to watch a simulated view for hours at a time with less eyestrain, even for viewers who normally have a lot of difficulty watching 3D images.

Figure 9:
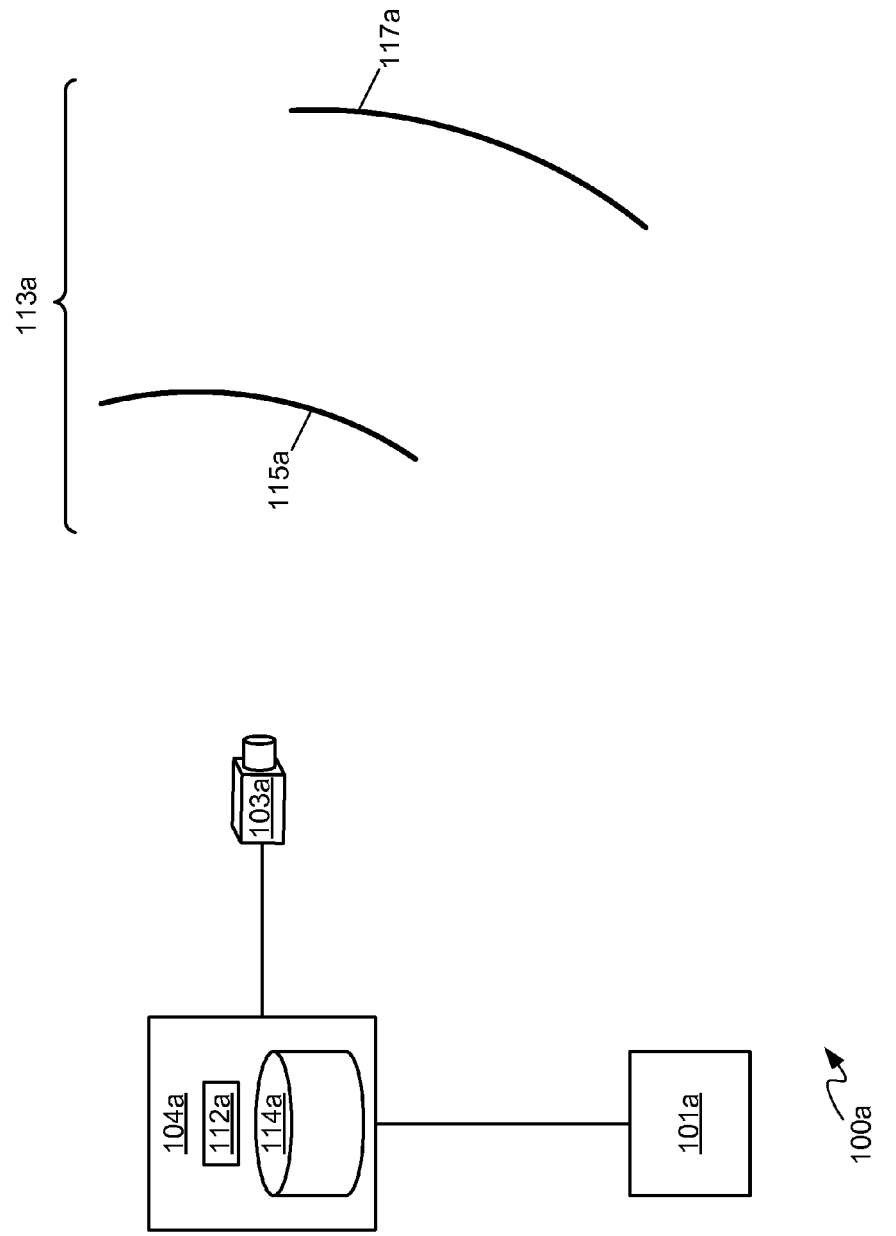
FIGS. 9 to 10 depict collimated stereo display systems, according to non-limiting implementations.

Attention is next directed to FIG. 9, which depicts a system 100a substantially similar to system 100, with like elements having like numbers, however with an "a" appended thereto. For example image modulator 100a is similar to image modular 100. However, in these implementations, screen 115a comprises a rear projection screen (sometimes referred to as a back projection screen (BPS)) and image modulator 100a is arranged to project onto a rear of screen 115a, with respective stereoscopic images being reflected by collimating mirror 117a. In other words, system 100a is similar to system 100 with, however, a rear projection geometry rather than a front projection geometry.

Figure 10:
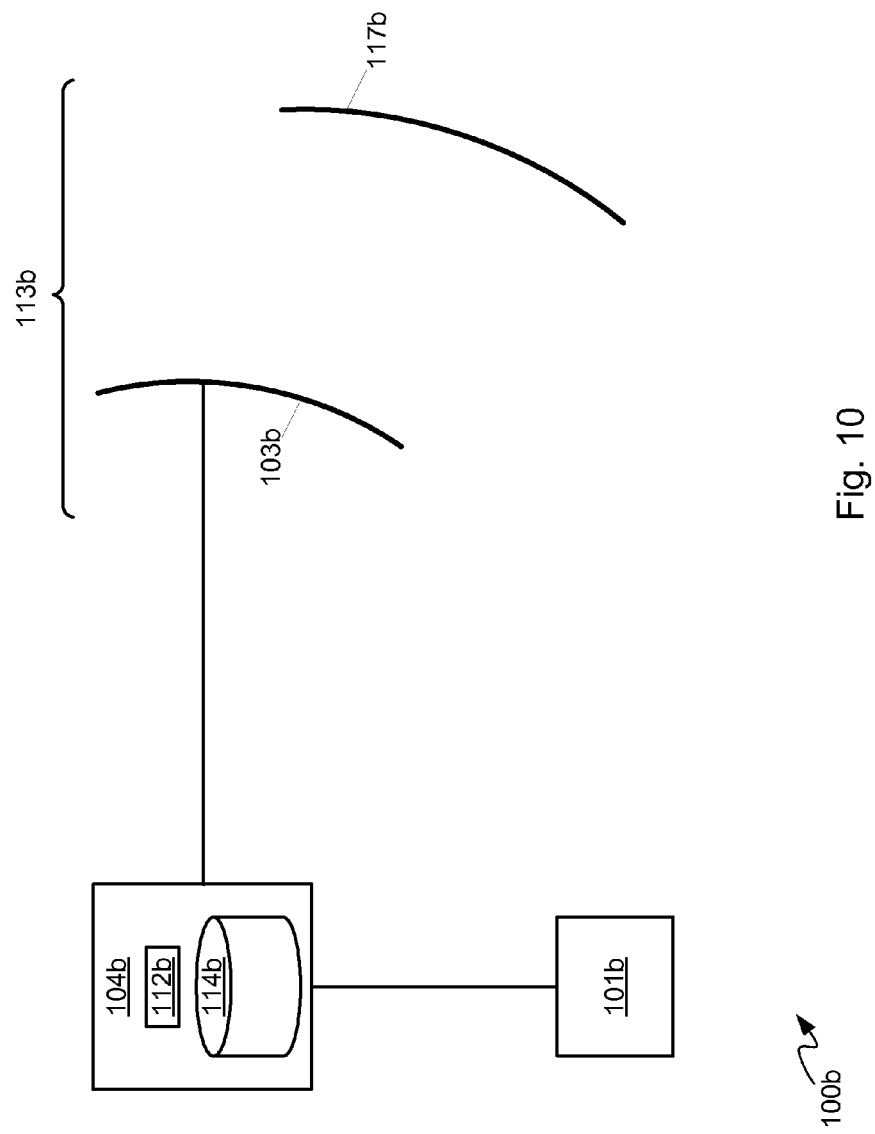

Attention is next directed to FIG. 10, which depicts a system 100b substantially similar to system 100, with like elements having like numbers, however with a "b" appended thereto. For example collimating mirror 117b is similar to collimating mirror 117. However, in these implementations, image modulator 103b is combined with a screen: in other words, image modulator 103b comprises a curved display (for example, based on light emitting diodes (LEDs), organic LEDs or any other suitable technology for producing curved displays), with respective stereoscopic images formed there upon, which are in turn reflected by collimating mirror 117b. In other words, system 100b is similar to system 100 with, however, the projection elements replaced by curved panel display technology. Indeed, it is appreciated that use of curved panel display technology can enable smaller near-the-eye displays of lower power and size than large simulator BPS screens used today in flight simulators.

Figure 11:
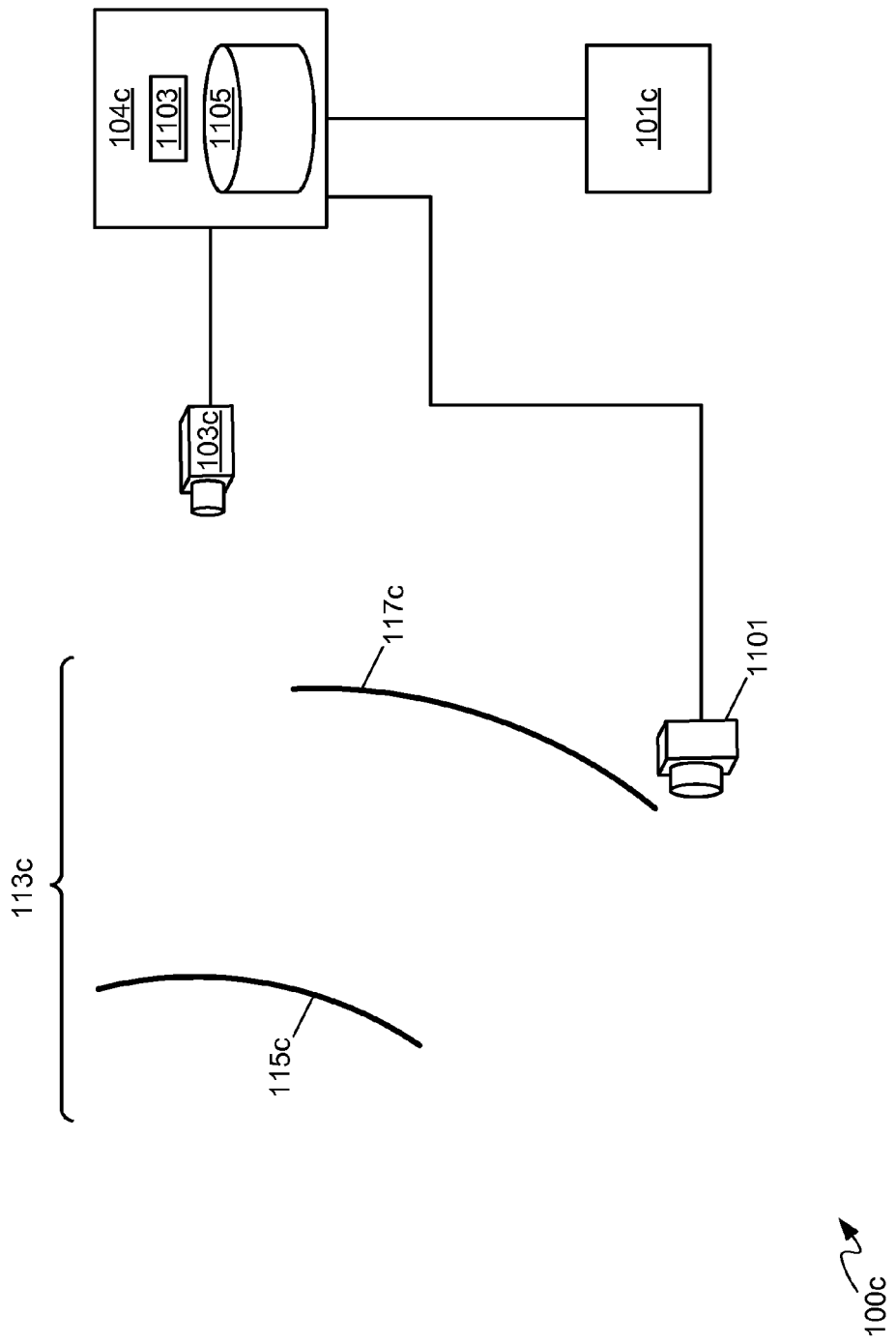
FIG. 11 depicts a collimated stereo display system with head tracking, according to non-limiting implementations.
Figure 12:
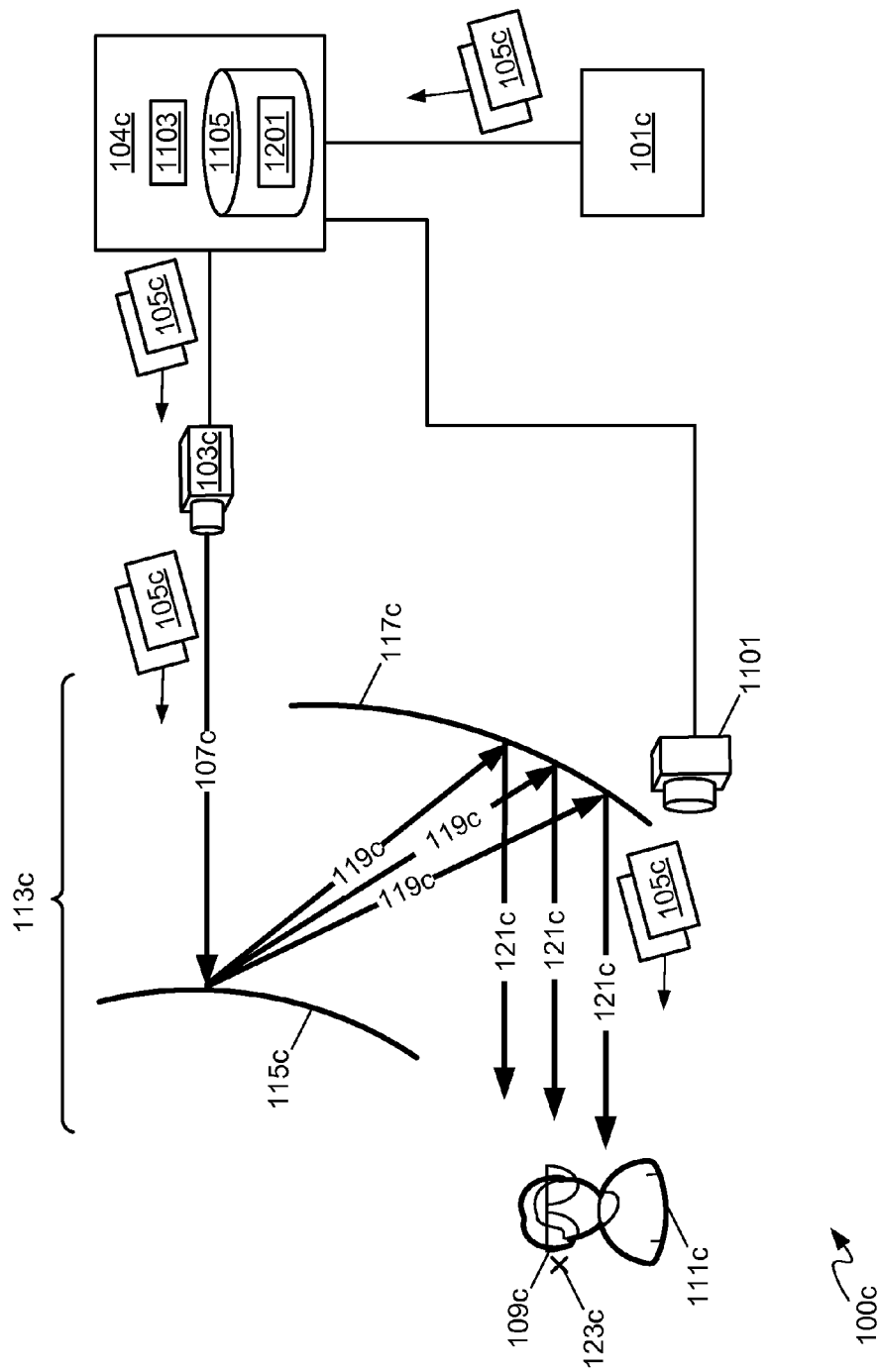
FIG. 12 depicts the system of FIG. 11 in use, according to non-limiting implementations.

Attention is next directed to FIG. 11, which depicts a system 100c substantially similar to system 100, with like elements having like numbers, however with a "c" appended thereto. For example image modulator 100c is similar to image modular 100. FIG. 12 depicts system 100 in use. However, system 100c further comprises head tracking apparatus 1101, in communication with computing device 104c, head tracking apparatus enabled to acquire a position of viewing apparatus 109c including but not limited to a position of a head of viewer 111c. It is appreciated that a position of viewing apparatus 109c can include, but is not limited to, a position of viewing apparatus 109c in the area in front of collimating mirror 117c and an orientation of viewing apparatus 109c (e.g., whether viewer 111c is looking left, right, up, down, straight ahead and the like). FIGS. 11 and 12 depict further details of computing device 104c, described in further detail below. However, it is appreciated that computing device 104c comprises a processor 1103 and a memory 1105, similar to processor 112 and memory 114 respectively.

In depicted in non-limiting example implementations, head tracking apparatus 1101 comprises one or more—of a digital camera and a digital video camera (generically a camera) oriented to take pictures of viewing apparatus 109c and/or a head of viewer 111c (e.g. an area in front of collimating mirror 117c). However, it is appreciated that any suitable head tracking apparatus is within the scope of present implementations, and the specification is not to be unduly limited to a camera. In some implementations, head tracking apparatus can further comprise a computing device (not depicted) for processing head tracking data to determine a position of viewing apparatus 109c; data indicative of the position of viewing apparatus 109c can then be communicated to computing device 104c.

However, in other implementations, once head tracking apparatus 1101 acquires a position of viewing apparatus 109c, the acquired data is communicated to computing device 104c for processing, such that a processor 1103 determines a position and of viewing apparatus 109c by processing the acquired data.

Indeed, it is appreciated that processor 1103, which is generally enabled to adjust stereoscopic images 105c for viewing based on the position of viewing apparatus 109c. For example, when the position of viewing apparatus 109c changes, stereoscopic images 105c are adjusted so that viewer 111c is presented with a view commensurate with the change in position. For example, when viewer 111c steps left or right, and/or moves his/her head up or down, the parallax and view in stereoscopic images 105c can be adjusted to reflect the change in position and/or orientation.

It is further appreciated, however, that as stereoscopic images 105c are projected onto a curved surface (i.e. screen 115c) for viewing and processor 1103 is hence further enabled to adjust stereoscopic images 105c based on a geometry of the curved surface. In other words, processor 1103 is generally enabled to both change the view represented by stereoscopic images 105c and adjust for the curved surface in the changed view.

It is further appreciated that head tracking apparatus 1101 can one or more of communicate with computing device 104c when a change in position of viewing apparatus 109c is detected and periodically communicate a position of viewing apparatus 109c to computing device 104c, whether the position has changed or not, such that changes in position can be determined by differences in position that occur from communication to communication.

Figure 13:
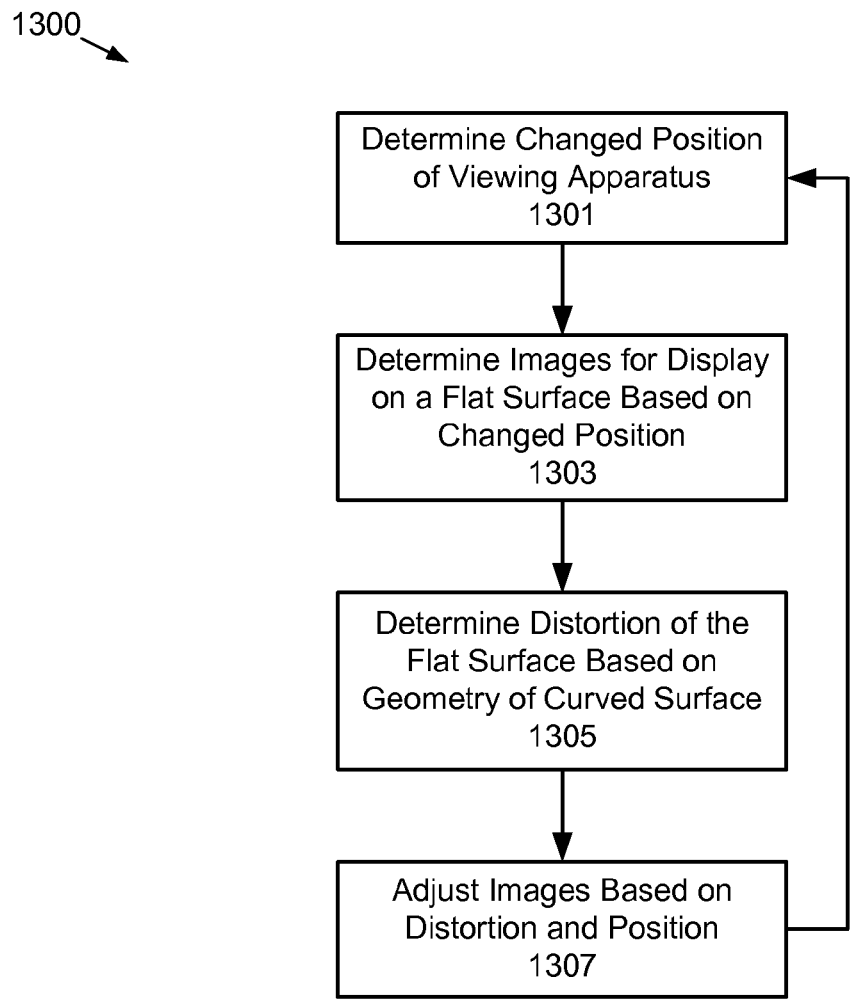
FIG. 13 depicts a method of adjusting stereoscopic images in the system of FIG. 11 when a position of a viewing apparatus changes, according to non-limiting implementations.

Attention is now directed to FIG. 13 which depicts a method 1300 of adjusting stereoscopic images 105c when a position of viewing apparatus 109c changes. In order to assist in the explanation of method 1300, it will be assumed that method 1300 is performed using system 100c. Furthermore, the following discussion of method 1300 will lead to a further understanding of system 100c and its various components. However, it is to be understood that system 100c and/or method 1300 can be varied, and need not work exactly as discussed herein in conjunction with each other, and that such variations are within the scope of present implementations.

Method 1300 further assumes that data 1201 indicative of a geometry of system 100 has been stored at memory 1105, data 1201 including but not limited to data indicative of the geometry of the curved surface (i.e. screen 115c), including but not limited to a curvature of screen 115c, and relative position(s) of image modulator 103c, screen 115c, and collimating mirror 117c, as well as a position of nominal DEP 111c, which is assumed to change when the position and/or orientation of viewing apparatus 109c changes.

At block 1301, processor 1103 receives data indicative that the position of viewing apparatus 109c has changed. For example, head tracking apparatus 1101 detects a change in position of viewing apparatus 109c and transmits data indicative of such to processor 1103.

At block 1303, processor 1103 determines images for display, the images comprising stereoscopic images 105c when they are to be projected onto a flat screen based on the changed position. For example, when viewing apparatus 109c moves up, down, left, right, etc., DEP 123c changes, which can be reflected in changes in viewing angle of virtual features in stereoscopic images 105c, as well as changes in parallax and the like. Processor 1103 is hence enabled to process stereoscopic images 105c to reflect these changes, as if stereoscopic images 105c were to be provided on a flat surface (i.e. not curved).

At block 1305, processor 1103 determines a distortion of the flat surface based on the data indicative of the geometry of the curved surface (i.e. screen 115c) and the position of viewing apparatus 109c. In other words, the flat surface is processed as a distortable mesh, and distorted to reflect the shape of screen 115c, when stereoscopic images 105c are viewed from the changed position viewing apparatus 109c.

At block 1307, the images produced at block 1301 are adjusted based on the distortion at block 1305, such that stereoscopic images 105c will appear undistorted when projected onto the curved surface.

In contrast, conventional display generators produce content that is rendered for a single point of perspective. This content is usually generated under the assumption that the display plane is a planar surface and that a simple view frustum can describe the display fields of view, with viewers in fixed positions in space simplifying the drawing of geometry in a simulated scene.

It is appreciated that to achieve a wide field of view, collimated displays generally employ a curved projection surface. Image warping allows the usually planar target to be treated as if it was a flexible mesh, allowing a uniform and appropriate distortion of the image so that once relayed off the curved screen to the curved optics in the collimated display solution, such as a collimating mirror, the result will be an image free of bowing or lensing distortions from the viewer's point of perspective.

However, such systems do not take into account that the viewer's position can and will vary. To address this, the present specification provides a solution of accommodating movement through a combination of tracking a viewer's position in space and correcting the image distortion on-the-fly, as in method 1300.

It is appreciated that stereopsis uses, for its three dimensional depth cures: the fusing of two unique perspective views (i.e. left eye and right eye); the monocular depth cue of accommodation (focus); and the binocular depth cue of convergence. With motion parallax added (through the point of perspective tracking described herein), all of the monocular depth cues humans have available are then available to reinforce stereoscopic depth cues.

It is hence appreciated that monocular depth cues that can be tethered to a stereoscopic experience include:

Perspective (a point of view from the viewer's position in space. Present implementations enable perspective to be altered as in the real world as the viewer moves).

Depth from motion (motion parallax and alteration in object size in the visible scene, which is generally tied to perspective. For example, when viewing trees in a forest, trees are positioned at differing planes relative to the viewer's position; as the viewer moves, close trees appear to move quickly within the viewer's field of view, and trees farther away move more slowly)

Occlusion (The effect moving about changes the visibility of objects that are occluded by one another. For example, trees in a forest are positioned at differing planes relative to the viewer's position; as the viewer moves, trees that are farther away can be occluded by trees closer to the viewer).

Hence, by adjusting images 105 based on a position of viewer 111c, all of the afore mentioned depth cues can be integrated into system 100c, which enables the virtual experience to appear much more lifelike It is appreciated that method 1300 can be repeated each time a change in position of viewing apparatus 109c is determined. Hence, stereoscopic images 105c can be dynamically adjusted as viewer 111c moves relative to collimating mirror 117c, providing an overall enhanced 3D environment.

Indeed, it is appreciated that the addition of motion parallax cues can be very powerful additional depth cue, extending far beyond accommodation, which is generally limited to one minute of arc by the depth of focus calculated from a 2 mm pupil in good light. Motion parallax from head movement can provide a stronger cue than eye separation and vergence since the "baseline" for images with stereo disparity can be longer. For example if a viewer moves their head 2 or 3 times to view a given scene, the greater depth and vernier acuity can be resolved over the usual 64 mm nominal eye spacing due to the motion parallax. For example, even viewers with one bad eye can perceive depth by head motion and accommodation if they have good head tracking Motion parallax can then takes the place of vergence cues.

It is further appreciated that, in some implementations, head tracking can be turned on and off. For example, for multiple viewer systems (such as cross cockpit collimated simulators with pilot and co-pilot in a non-limiting example), head tracking may not be desirable unless only a single viewer is using the system. Hence, in these implementations, head tracking can be turned on for a single viewer and turned off for multiple viewers.

Figure 14:
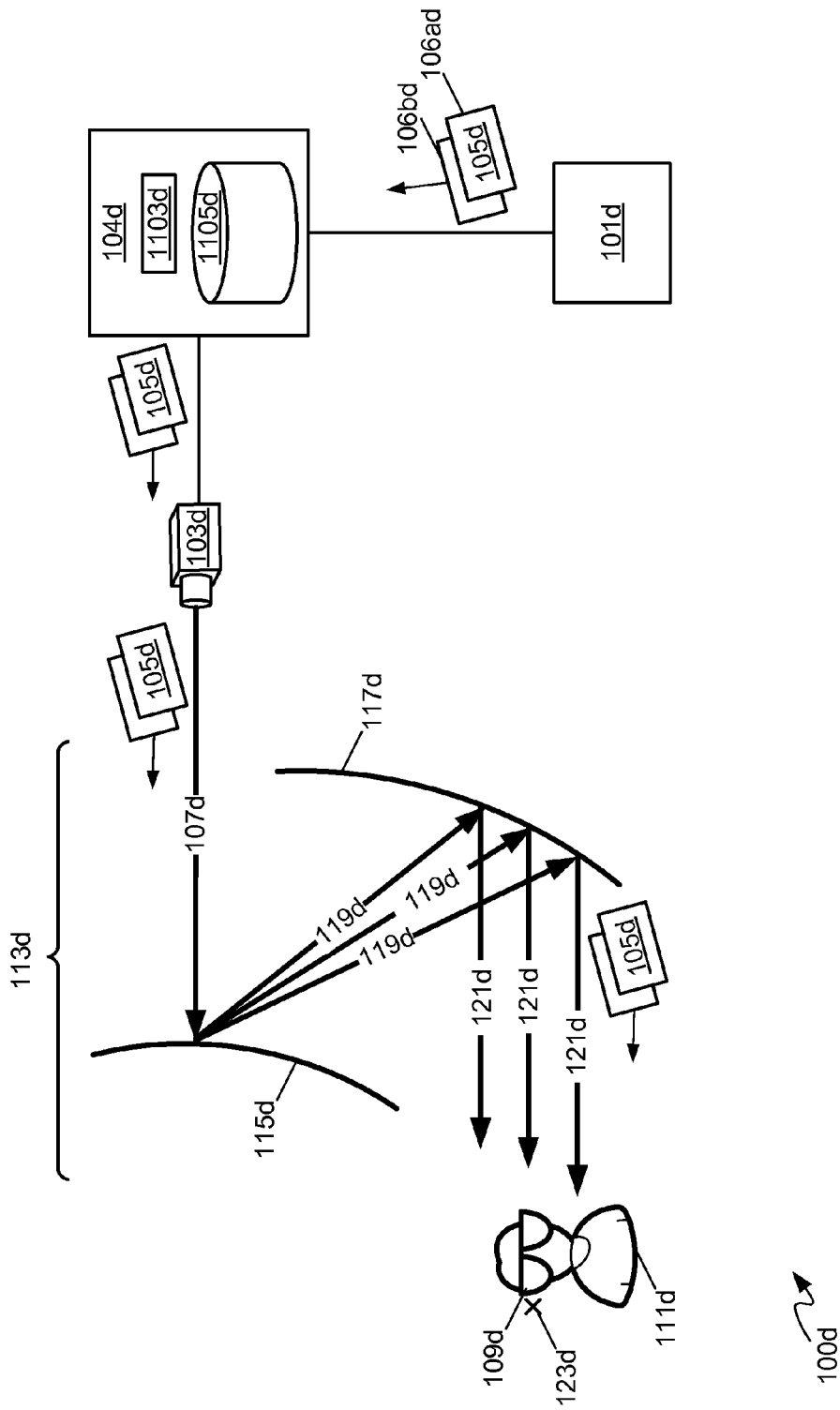
FIG. 14 depicts an in use collimated stereo display system with interocular distance variation, according to non-limiting implementations.

Attention is next directed to FIG. 14, which depicts an "in-use" system 100c substantially similar to system 100c, with like elements having like numbers, however with a "d" appended thereto, rather than a "c". For example computing device 104*d* is similar to computing device 104*c*. However, in these implementations, a head tracking device is optional (and indeed not depicted), and processor 1103*d* is enabled to adjust stereoscopic images 105*d* by varying interocular distance between left eye images 106*a* d and right eye images 106*bd*. For example, as depicted in profile in FIG. 15, a "virtual" landscape 1500 can include a virtual feature 1501, for example a geographic feature such as a hill or a mountain. DEP 123*d* is depicted as in the "sky" in FIG. 15 as it assumed that landscape 1500 is part of a flight simulation system and hence viewer 111*d* would be located above landscape 1500. A virtual distance 1503 can be determined between DEP 123*d* (i.e. viewer 111*d*) and feature 1501.

Figure 15:
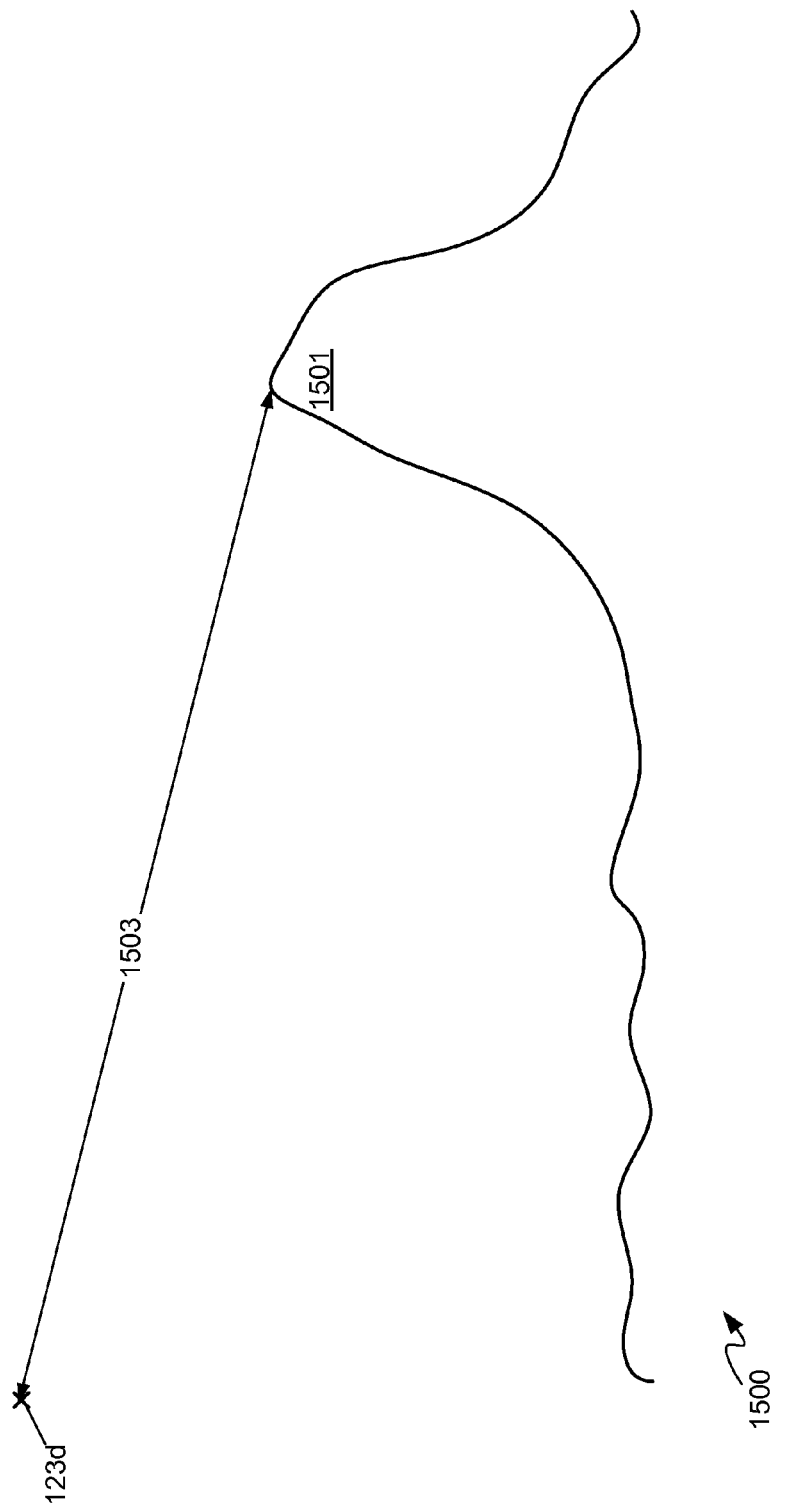
FIG. 15 depicts a virtual landscape used in the system of FIG. 14, according to non-limiting implementations.
Figure 16:
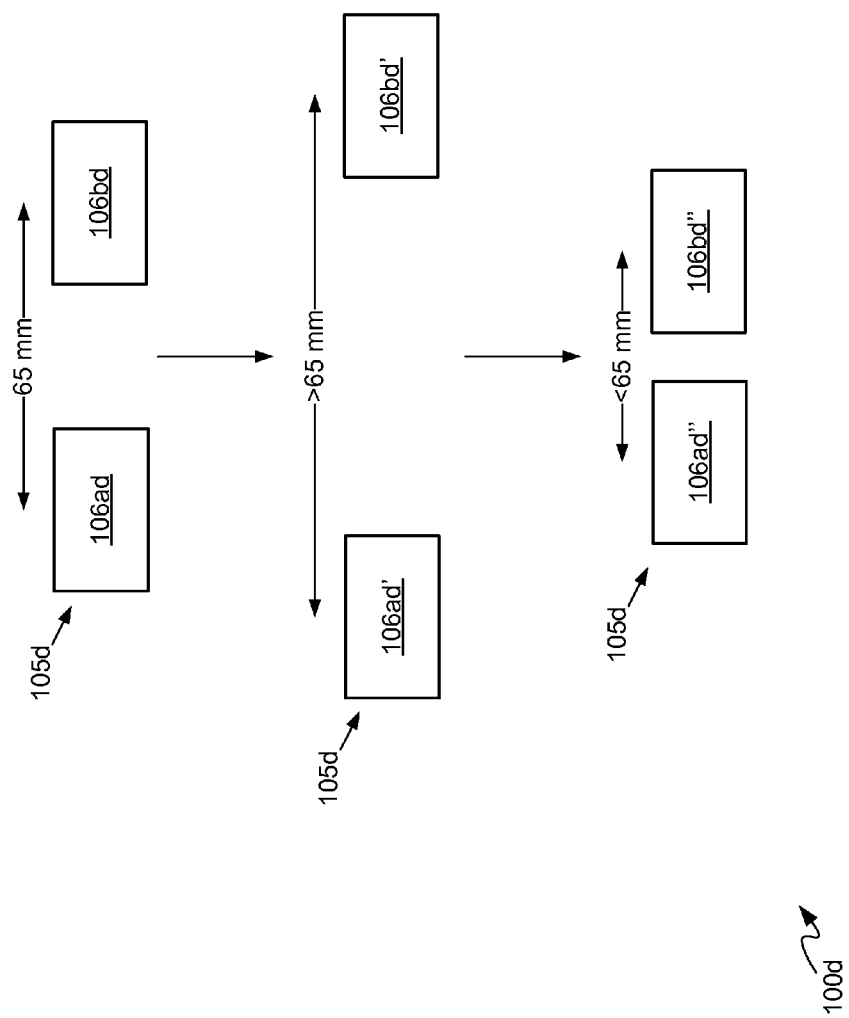
FIG. 16 depicts changes in stereoscopic images when the interocular distance changes in the system of FIG. 14, according to non-limiting implementations.

It is appreciated that landscape 1500 would generally not be "seen" as depicted in FIG. 15 by viewer 111*d*, but rather stereoscopic images 105*d* would be generated to represent a view of landscape 1500 as seen from DEP 123*d*. Generally, stereoscopic images 105*d* are generated based on a human norm interocular distance of about 64 mm (though the human norm interocular distance is generally appreciated to be in a range of about 62 mm to about 65 mm hence any suitable interocular distance can be chosen as representing the norm; however human interocular distances can range from about 58 mm to about 71 mm). However, as depicted in FIG. 16, the interocular distance between left eye images 106*ad* and right eye images 106*bd* can be varied, for example increased or decreased, depending on virtual distance 1503, to produce updated left eye images 106*ad'* and right eye images 106*bd'* based on a new interocular distance. For example, as depicted in FIG. 16, the interocular distance can be increased such that left eye images 106*ad'* and right eye images 106*bd'* are provided in hyperstereo, which is generally appreciated to provide more optical depth information to a viewer than standard stereo images. In other words, in these implementations, system 100*d* is enabled to enter a hyperstereo mode.

It is appreciated that hyperstereo can affects a sense of scale, but is useful for increasing the stereo disparity of distant objects. For example, hyperstereo is used in aerial photographs with very long base lines to produce topographical maps. It is also useful with binoculars or rangefinders to effectively increase the interocular distance and baseline to judge relative depth. Furthermore, at distances of greater than about 100 m, interocular distance of several hundred feet do not generally affect distance perception considerably, but increases the stereo disparity of distant objects. Hence, providing hyperstereo images of landscape, for example, can provide enhanced details of virtual features. Indeed hyperstereo baseline images of earth orbits (e.g. from one side of planet orbit to the other) has been used for scientific 3D studies of the moon.

In some implementations, processor 1103*d* can be enabled to provide left eye images 106*a* d and right eye images 106*bd* in hyperstereo when virtual distance 1503 is one or more of above a first given threshold value and below a second given threshold value. For example, a first given threshold value can be around 100 meters, and a second given threshold value can be around 1000 meters, however any suitable thresholds are within the scope of present implementations.

For example, baselines below 64 mm can be useful for both micro and macro work, such as examining bugs or blood cells. However, when visualizations of, for example, galaxies are provided, baselines of light years and/or parsecs and/or astronomical units can be within the scope of present implementations. Hence, it is appreciated that there are no particular limitations on interocular distance in present implementations, which can hence range from zero (for two-dimensional images, as described below, to extremely large distances). It is further appreciated that eyepoints grow equally positive and negative to the "normal" interocular distance of about −32 mm for the left eye and +32 mm for the right eye (e.g. a total of about 64 mm). However, the second threshold value can also be less than the first threshold value such that hyperstereo is provided at small distances and at large distances: for example, the second threshold value can be less than 9 meters such that virtual features close to DEP 123*d* appear larger than life to provide more optical detail than would normally be available when the interocular distance was at human norm.

It is further appreciated that while examples of varying interocular distance heretofore have all involved flight simulators, varying interocular distance can be used in any suitable immersive environment, as described above. For example, a variable interocular distance can either be manually dialled in or automatically change depending on the actual distances being viewed in a simulated scene (e.g. when a viewer is closer to the ground, a more natural interocular distance can be used, and when a viewer is at higher altitudes a hyperstereo setting can be used).

In some of these implementations, an interocular distance of less than human norm can be used, as also depicted in FIG. 16 (see left eye images 106*ad''* and right eye images 106*bd''*). For example when imaging drugs in a medical visualization environment, or any other very small features in any other suitable immersive environment, where human norm would not yield an adequate view of the feature, an interocular distance of less than human norm can be used. In other words, system 100*d* can also be enabled to enter a hypostereo mode which can be useful for very close work viewing such as with or microscopy or macro applications, or the like.

In general, it is appreciated that interocular distance can be varied in any suitable manner, including but not limited to based on thresholds and/or virtual distances, for any suitable immersive environment.

It is yet further appreciated that as human interocular distances can vary from person to person, interocular distance for system 100*d* can be also be varied based on an interocular distance of a given viewer. For example, interocular distance for system 100*d* can be fixed for given viewer, but then changed for a different viewer to accommodate variations in interocular distance from viewer to viewer. In these implementations, a base interocular distance can be input into system 100*d*, for example at computing device 104*d*, prior to a given viewer using system 100*d*.

Figure 17:
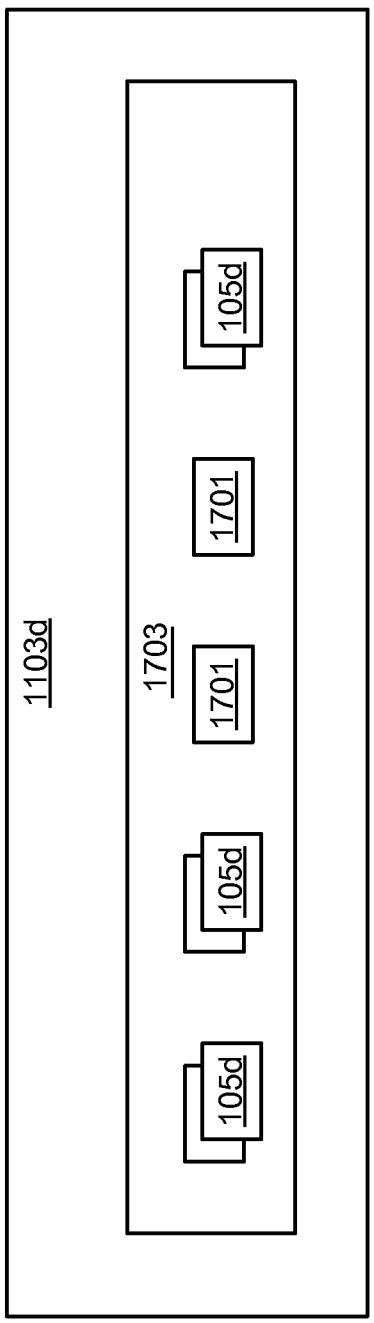
FIG. 17 depicts insertion of two dimensional images into a stream of three dimensional images in the system of FIG. 14, according to non-limiting implementations.
Figure 18:
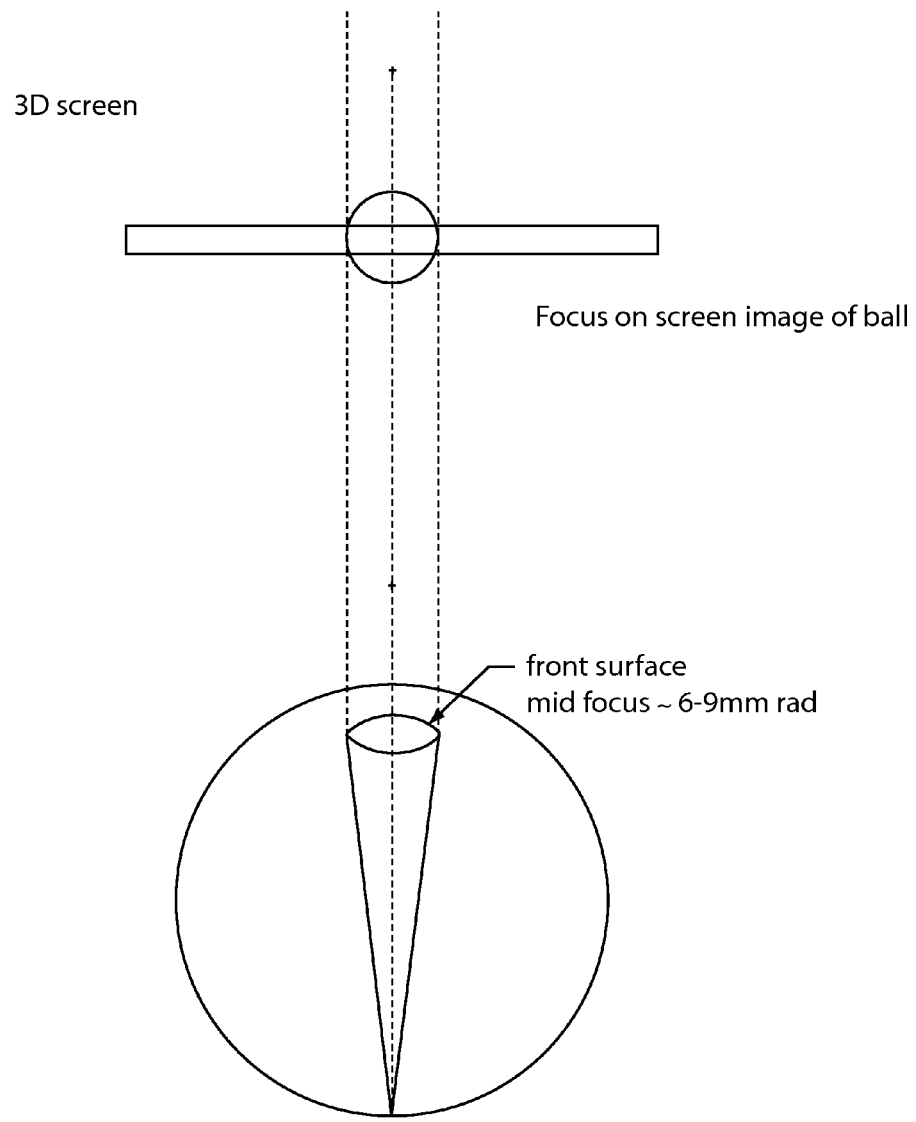
FIG. 18 depicts accommodation behaviour of human eyes when focusing on virtual objects in stereoscopic images projected onto a screen, according to non-limiting implementations.

In other implementations, as depicted in FIG. 17, processor 1103*d* can be enabled to insert two dimensional images 1701 into a stream 1703 of stereoscopic images 105*d* based on virtual distance 1503. Indeed, the insertion of two dimensional images 1701 effectively means that the interocular distance has been reduced to 0 mm. In some implementations, processor 1103*d* can be enabled to insert two dimensional images 1701 into stream 1703 of stereoscopic images 105*d* when virtual distance 1503 is one or more of above a first given threshold value and below a second given threshold value. For example, above a given threshold value of virtual distance 1503, such as 1000 meters, the very little parallax will be present in stereoscopic images 105*c*, and hence switching to a two dimensional view via insertion of two dimensional images 1701 into stream 1703 of stereoscopic images 105*d* can reduce processing time. It is appreciated that any suitable number of two dimensional images 1701 can be inserted into stream 1703 and for any suitable length of time depending, for example, on virtual distance 1703.

Similarly, below a second given threshold value there can be situations where a three dimensional image may not be suitable or desired, and hence, system 100d can switch to a two dimensional mode. Switching to a two dimensional mode can save processing time, for example for higher frame rates and/or when processing many features in a scene (e.g. processing many polygons).

In some implementation processor 1103d is enabled to insert two dimensional images 1701 into stream 1703 of stereoscopic images 105c by replacing one of the left eye images 106ad and the right eye images 106bd with the other of right eye images 106bd and the left eye images 106ad. In other words, each of the left eye and right eye are provided with the same image.

Indeed, it is now apparent that varying of interocular distance, including but not limited to setting interocular distance to 0 mm for a two dimensional mode, can comprise an interactive real time control of interocular distance to enable various features, including but not limited to:

1. Quickly switching and recalibrating from one viewer to another viewer with different interocular distance, so that the life time scaling effects and distance judgements are relevant to a given viewers training at his/her particular interocular distance throughout his/her lifetime 2. Quickly switching from a three dimensional mode at a "normal" interocular distance to a two dimensional mode to save bandwidth or where only very long distances are visible.

3. Changing the "feel" and/or view of system 100d by switching between a normal mode (interocular distance at a baseline) to a hyperstereo mode (interocular distance greater than a baseline) or a hypostereo mode (interocular distance less than a baseline).

While various implementations are described herein in isolation, it is appreciated, for example, that head tracking and interocular distance variation can be combined in any suitable combination as desired.

Collimated stereo display systems have been described herein to provide relief for eye strain when viewing three dimensional images, with various further improvements for improving the three dimensional viewing experience.

Those skilled in the art will appreciate that in some implementations, the functionality of system 100, 100a, 100b, 100c, 100d can be implemented using pre-programmed hardware or firmware elements (e.g., application specific integrated circuits (ASICs), electrically erasable programmable read-only memories (EEPROMs), etc.), or other related components. In other implementations, the functionality of 100, 100a, 100b, 100c, 100d can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:

a processor;

an image generator configured to provide a stream of stereoscopic images comprising left eye images and right eye images;

a projector comprising at least one image modulator configured to receive the stream of stereoscopic images from the image generator and form light into the stereoscopic images;

a viewing apparatus configured to filter the light into the left eye images and the right eye images respectively thereby providing a three dimensional rendering of the stereoscopic images when viewed through the viewing apparatus;

collimation apparatus configured to receive and collimate the light from the at least one image modulator, such that rays of light are substantially parallel when the stereoscopic images are received at the viewing apparatus; and, a curved surface, the stereoscopic images projected onto the curved surface for viewing and the processor is configured to adjust the stereoscopic images based on: a geometry of the curved surface and motion parallax cues based on a position of a viewer, the collimation apparatus comprising a collimating mirror configured to reflect the light from the curved surface such that reflected light is collimated and both accommodation and vergence cues in the stereoscopic images are generally in sync, the motion parallax cues taking the place of the vergence cues when head movement of the viewer is detected, so that objects in the stereoscopic images are pushed further away by the collimating mirror and infinity in the stereoscopic images looks like a real infinity out a window using the viewing apparatus, with eyes of the viewer relaxed both in vergence and focus.

2. The system of claim 1, further comprising:

head tracking apparatus configured to acquire a position of the viewing apparatus; and the processor further configured to adjust the stereoscopic images for viewing based on one or more of the position and the orientation of the viewing apparatus.

3. The system of claim 1, further comprising a memory for storing data indicative of the geometry.

4. The system of claim 1, wherein the processor is further configured to adjust the stereoscopic images based on the geometry of the curved surface by:

determining images for display, the images comprising the stereoscopic images when they are to be provided on a flat screen;

determining a distortion of the flat screen based on the data indicative of the geometry of the curved surface and the position of the viewing apparatus; and adjusting the images based on the distortion such that the stereoscopic images will appear undistorted when projected onto the curved surface.

5. The system of claim 4, wherein adjusting the stereoscopic images is repeated each time a change in position of the viewing apparatus is determined.

* * * * *